(12) United States Patent
Matsuoka et al.

(10) Patent No.: US 10,373,764 B2
(45) Date of Patent: Aug. 6, 2019

(54) PROCESS FOR MANUFACTURING AGGLOMERATED PARTICLES OF TANTALUM, MIXED TANTALUM POWDER AND PROCESS FOR MANUFACTURING SAME, TANTALUM PELLET AND PROCESS FOR MANUFACTURING SAME, AND CAPACITOR

(71) Applicant: Global Advanced Metals USA, Inc., Waltham, MA (US)

(72) Inventors: Ryosuke Matsuoka, Fukushima (JP); Eiji Kataoka, Fukushima (JP); Yoshikazu Noguchi, Fukushima (JP); John Koenitzer, Waltham, MA (US); Sridhar Venigalla, Waltham, MA (US)

(73) Assignee: Global Advanced Metals USA, Inc., Waltham, MA (US)

( * ) Notice: Subject to any disclaimer, the term of this patent is extended or adjusted under 35 U.S.C. 154(b) by 56 days.

(21) Appl. No.: 15/792,785

(22) Filed: Oct. 25, 2017

(65) Prior Publication Data
US 2018/0047516 A1 Feb. 15, 2018

Related U.S. Application Data

(60) Division of application No. 13/294,451, filed on Nov. 11, 2011, now Pat. No. 9,831,041, which is a
(Continued)

(30) Foreign Application Priority Data

May 15, 2009 (JP) .................................. 2009-119000
May 15, 2009 (JP) .................................. 2009-119001

(51) Int. Cl.
*B22F 9/24* (2006.01)
*H01G 9/052* (2006.01)
(Continued)

(52) U.S. Cl.
CPC ......... *H01G 9/0525* (2013.01); *B22F 1/0096* (2013.01); *H01G 9/052* (2013.01);
(Continued)

(58) Field of Classification Search
CPC .. B22F 1/0085; B22F 1/0096; B22F 2998/10; B22F 2301/20; B22F 9/04; H01G 9/0525; H01G 9/15
(Continued)

(56) References Cited

U.S. PATENT DOCUMENTS 6,193,779 B1    2/2001   Reichert et al.
6,238,456 B1    5/2001   Wolf et al.
(Continued)

FOREIGN PATENT DOCUMENTS

JP   2002-206105    7/2002
JP   2003-166002    6/2003
(Continued)

OTHER PUBLICATIONS

English abstract of JP 2007291487 A, Nov. 2007 (Year: 2007).*
(Continued)

*Primary Examiner* — Jie Yang
(74) *Attorney, Agent, or Firm* — Kilyk & Bowersox, P.L.L.C.

(57) ABSTRACT

A method for producing agglomerated tantalum particles, comprising: a step for grinding secondary tantalum particles, which are obtained by reducing a tantalum salt, and adding water thereto to give a water-containing mass; a step for drying said water-containing mass to give a dry mass; a step for sieving said dry mass to give spherical particles; and a step for heating said spherical particles. A mixed tantalum powder comprising a mixture of agglomerated tantalum particles (X) with agglomerated tantalum particles (Y), wherein said agglomerated tantalum particles (X) show a
(Continued)

cumulative percentage of particles with particle size of 3 μm or less of 5 mass % or less after 25 W ultrasonic radiation for 10 min, while said agglomerated tantalum particles (Y) show a cumulative percentage of particles with particle size of 3 μm or less of 10 mass % or more after 25 W ultrasonic radiation for 10 min.

7 Claims, 10 Drawing Sheets

Related U.S. Application Data continuation of application No. PCT/JP2010/003281, filed on May 14, 2010.

(51) Int. Cl.
*B22F 1/00* (2006.01)
*H01G 9/15* (2006.01)

(52) U.S. Cl.
CPC ....... *B22F 2998/10* (2013.01); *B22F 2999/00* (2013.01); *H01G 9/15* (2013.01)

(58) Field of Classification Search
USPC .......................................................... 75/245
See application file for complete search history.

(56) References Cited

U.S. PATENT DOCUMENTS

| | | |
|---|---|---|
| 6,689,187 B2 | 2/2004 | Oda |
| 7,204,866 B2 | 4/2007 | Oda et al. |
| 7,666,247 B2 | 2/2010 | He et al. |
| 7,824,452 B2 | 11/2010 | Jones et al. |
| 2012/0081840 A1 | 4/2012 | Matsuoka et al. |

FOREIGN PATENT DOCUMENTS

| | | |
|---|---|---|
| JP | 2007-273965 | 10/2007 |
| JP | 2007-291487 A | 11/2007 |
| JP | 2009-102680 | 5/2009 |

OTHER PUBLICATIONS

Japanese Office Action dated Jul. 30, 2013 issued in corresponding Japanese Patent Application No. 2009-119001 (6 pages).
Japanese Office Action dated Jul. 30, 2013 issued in corresponding Japanese Patent Application No. 2009-119000 (5 pages).
International Search Report issued in corresponding International Patent Application No. PCT/JP2010/003281 dated Jul. 20, 2010 (4 pages).

* cited by examiner

[FIG. 1]
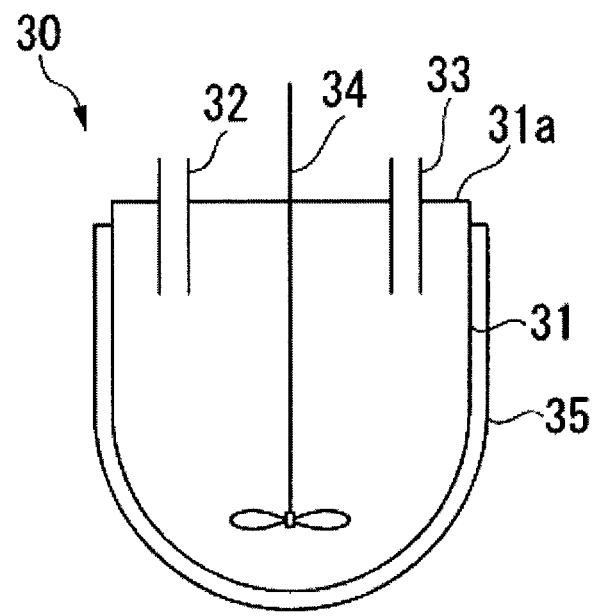

[FIG. 2]
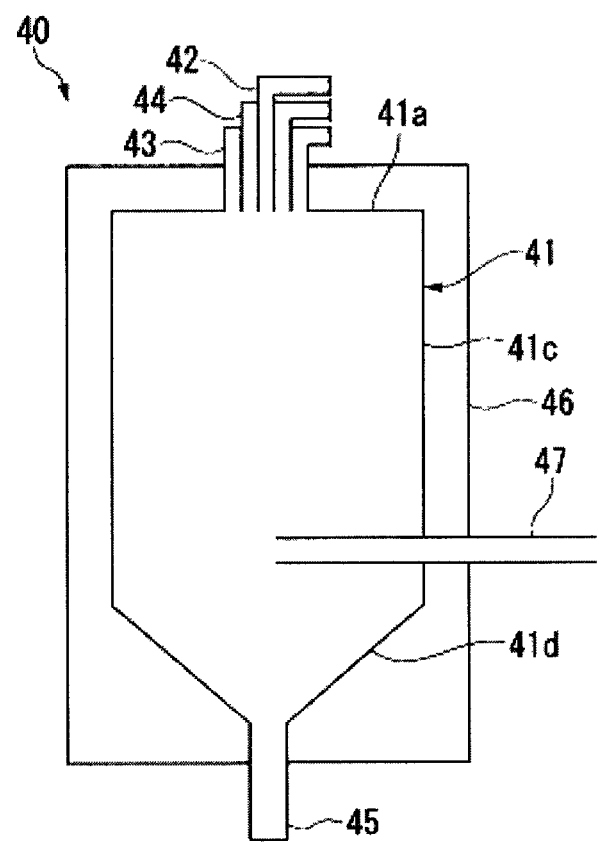

[FIG. 3]
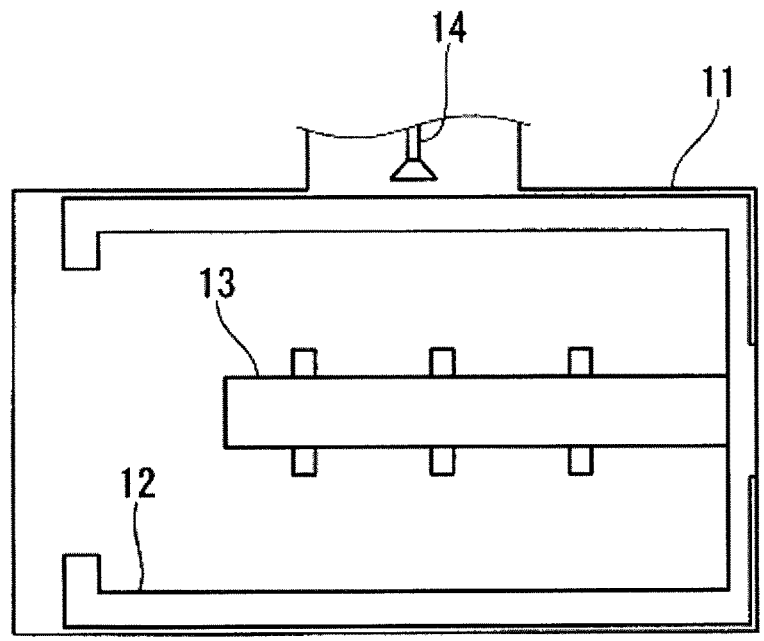
[FIG. 4]
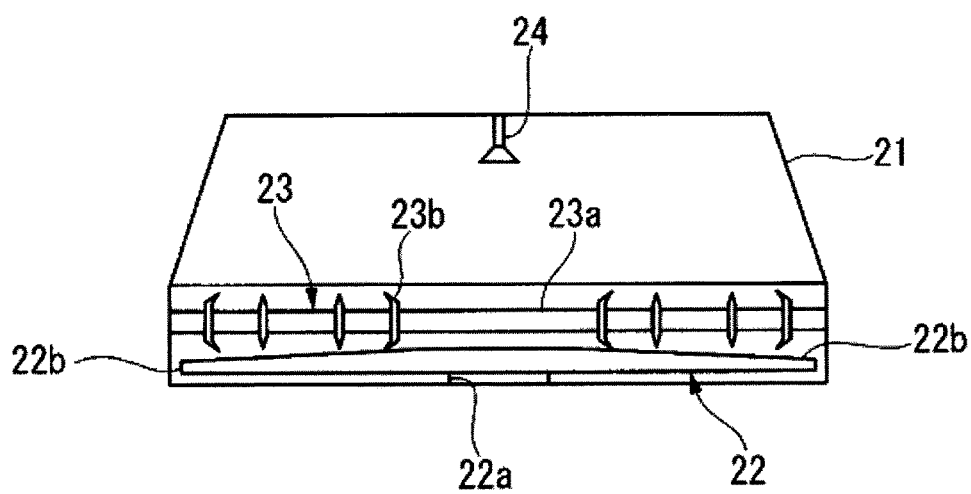

[FIG. 5]
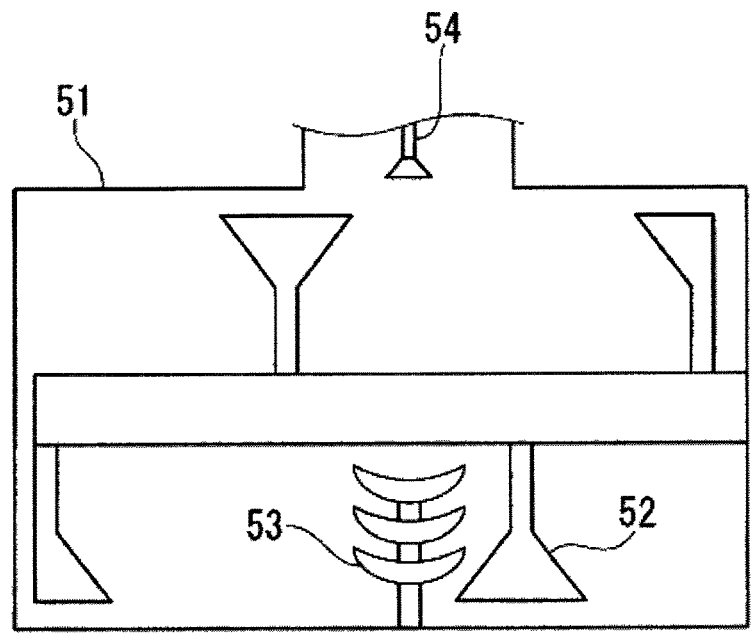
[FIG. 6]
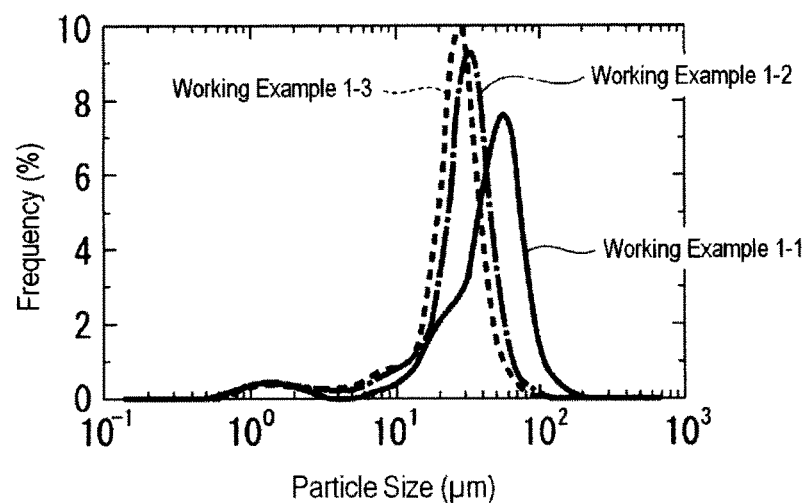

[FIG. 7]
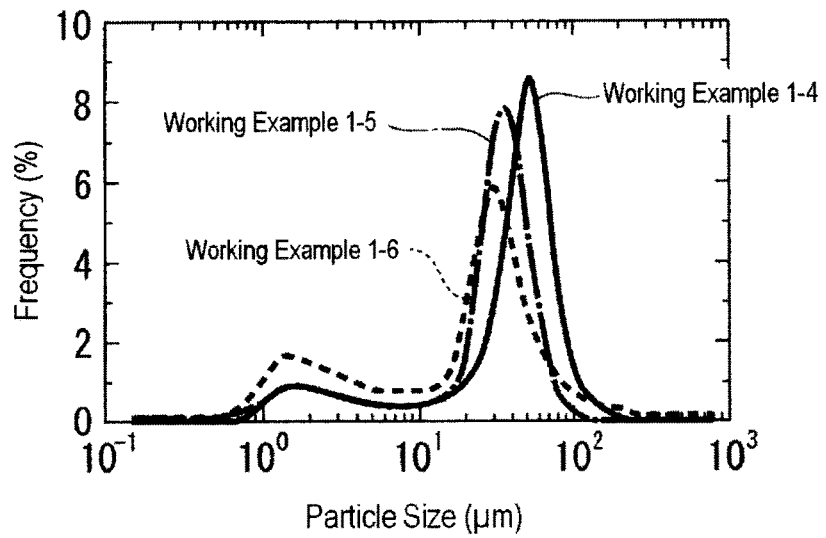
[FIG. 8]
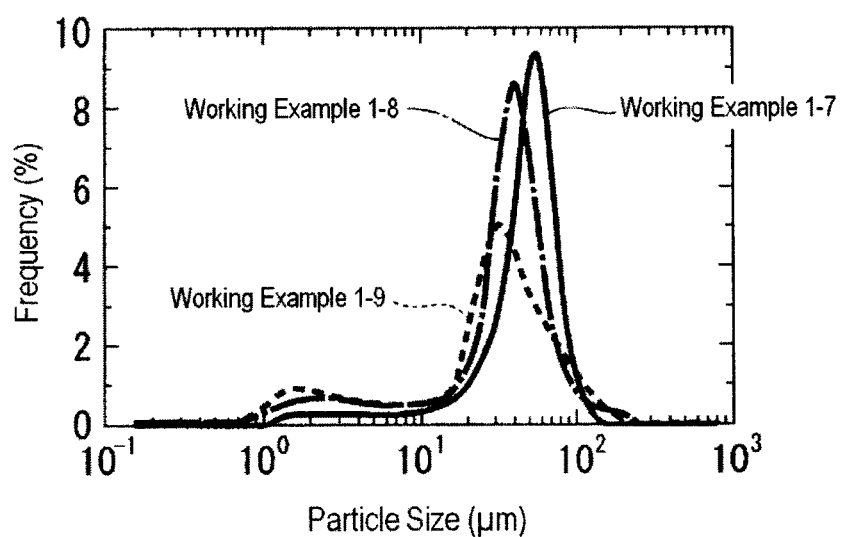

[FIG. 9]
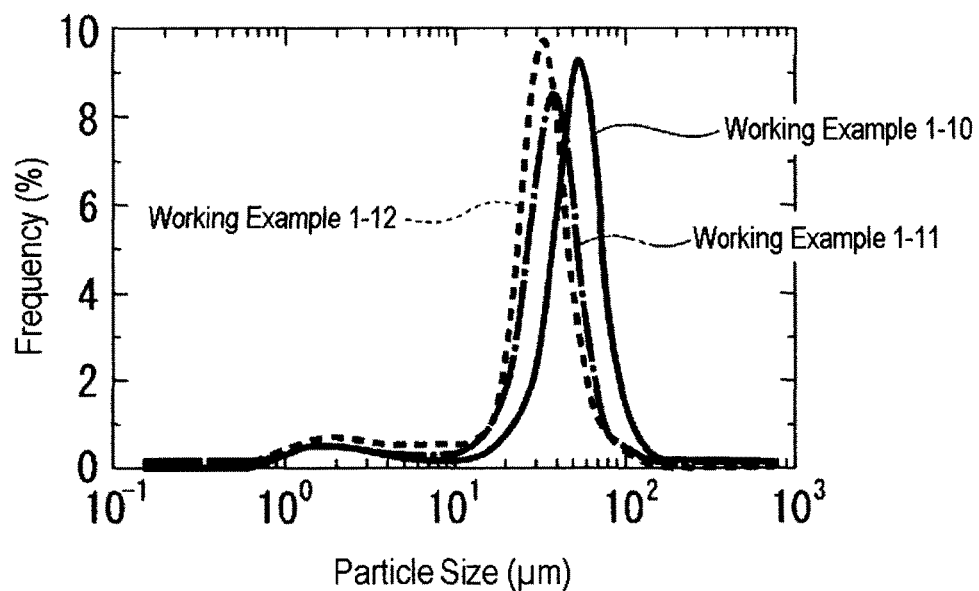
[FIG. 10]
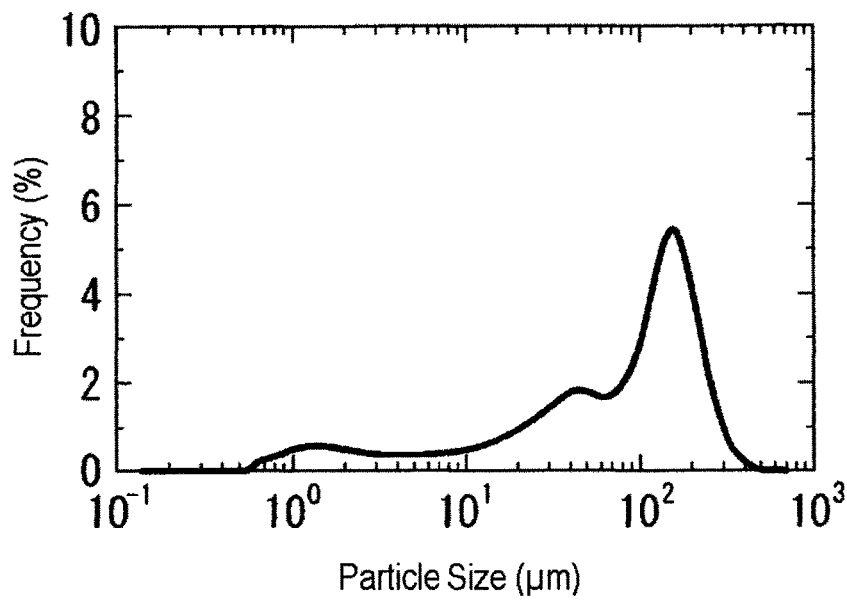

[FIG. 11]
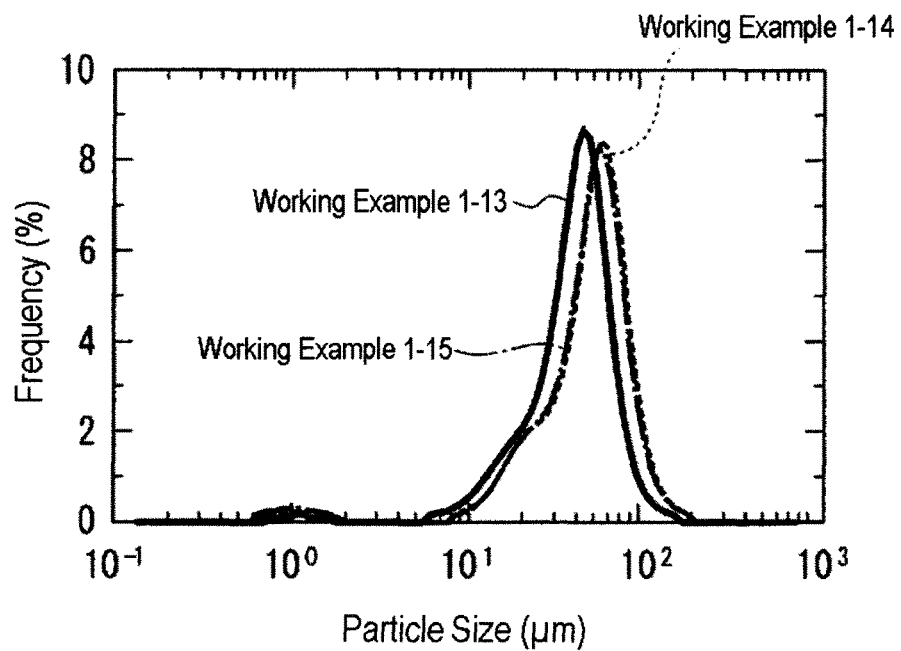
[FIG. 12]
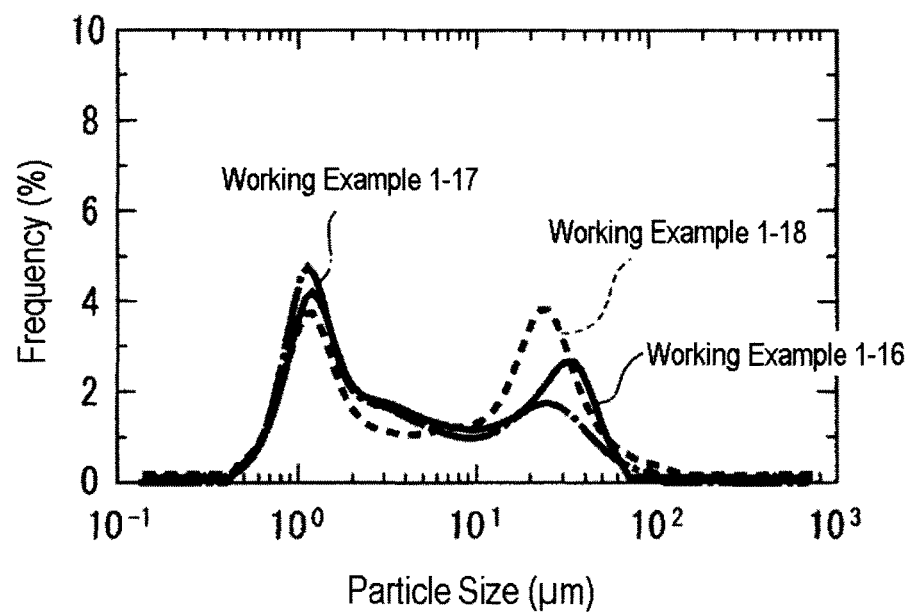

[FIG. 13]
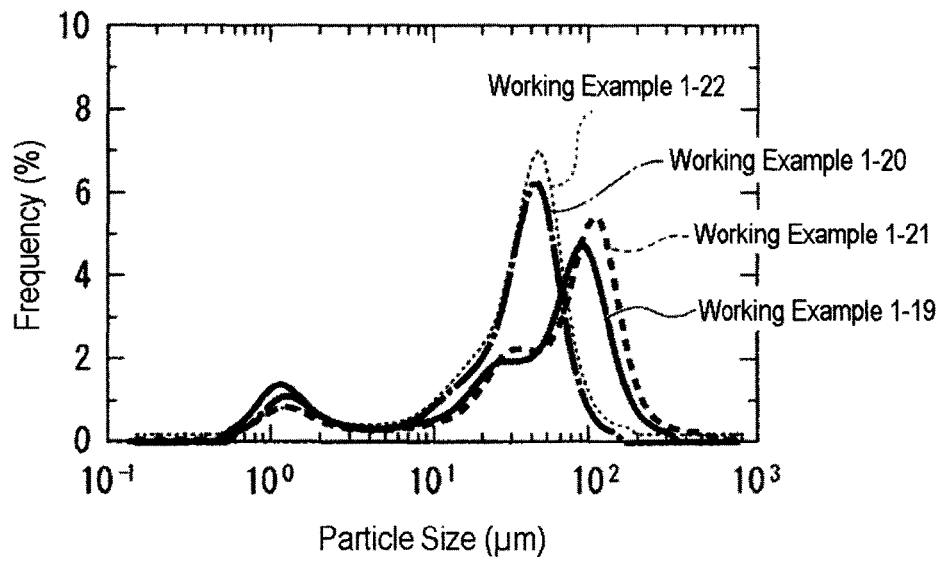
[FIG. 14]
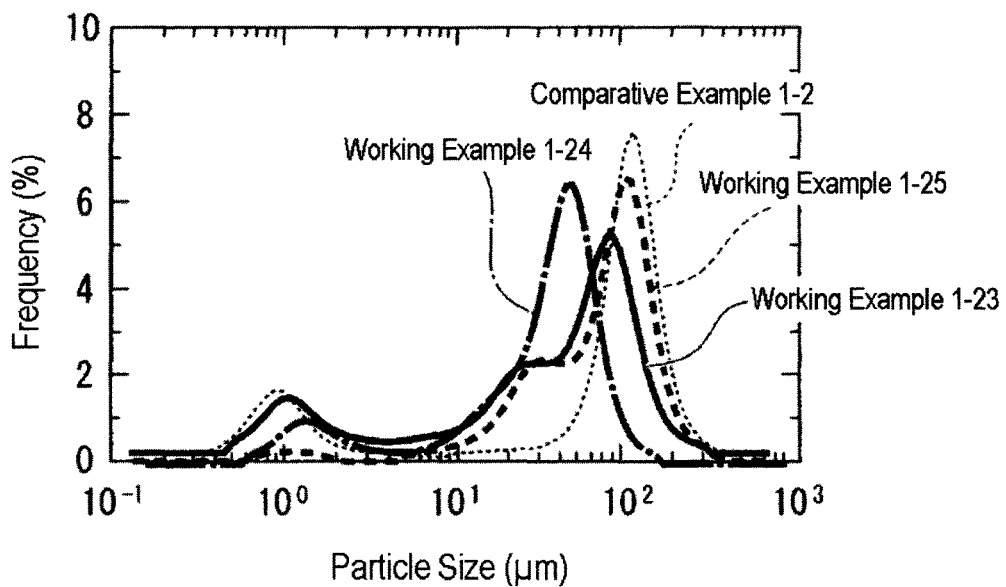

[FIG. 15]
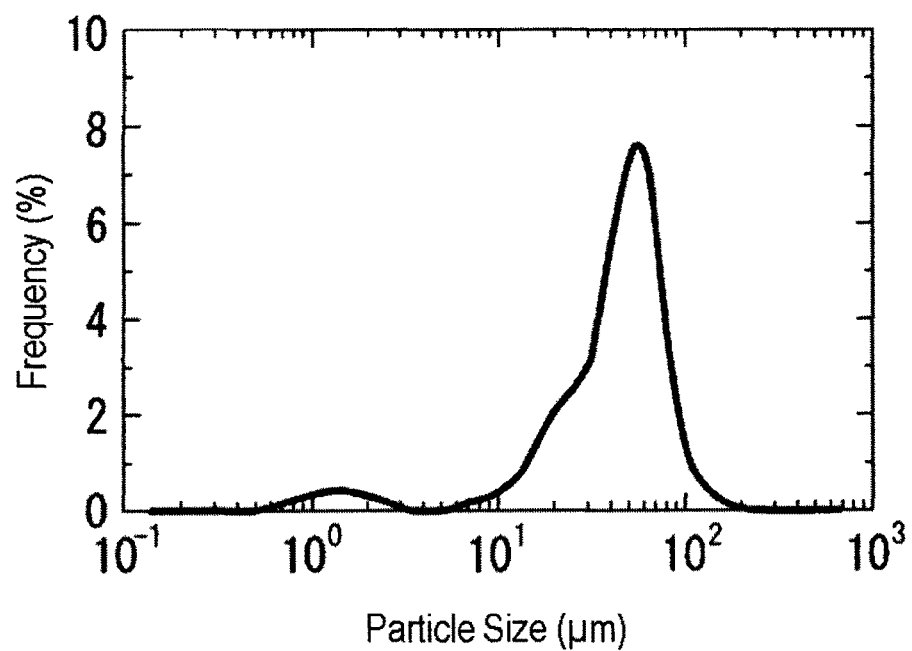

[FIG. 16]
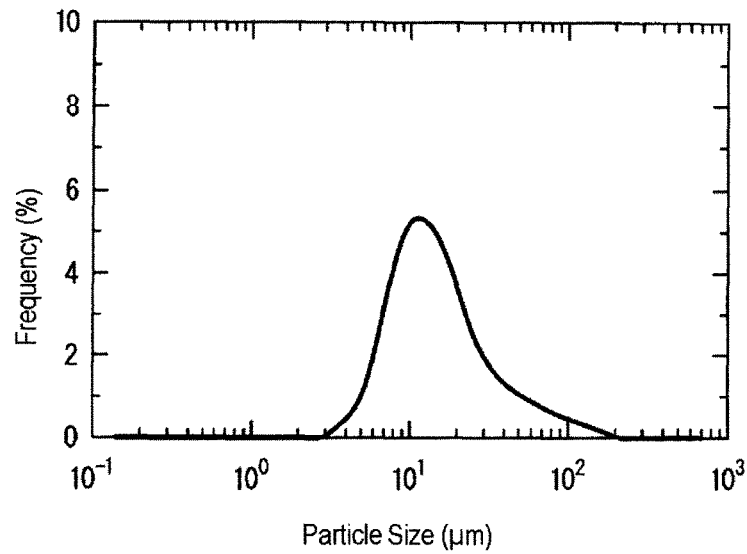
[FIG. 17]
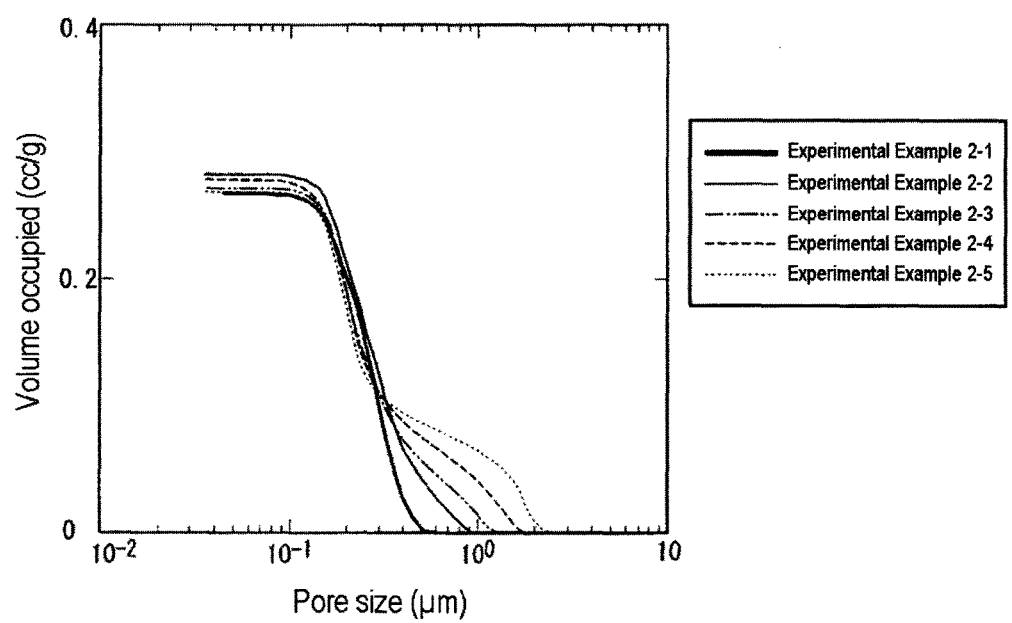

PROCESS FOR MANUFACTURING AGGLOMERATED PARTICLES OF TANTALUM, MIXED TANTALUM POWDER AND PROCESS FOR MANUFACTURING SAME, TANTALUM PELLET AND PROCESS FOR MANUFACTURING SAME, AND CAPACITOR

This Application is a divisional of U.S. patent application Ser. No. 13/294,451, filed Nov. 11, 2011, which is a continuation of International Application No. PCT/JP2010/003281, filed May 14, 2010, which in turn claims priority from Japanese Patent Application No. 2009-119000, filed May 15, 2009, and Japanese Patent Application No. 2009-119001, filed May 15, 2009, which are incorporated by reference herein.

TECHNICAL FIELD

The present invention relates to a process for manufacturing agglomerated particles of tantalum used in capacitors, etc., a mixed tantalum powder and a process for manufacturing same, a tantalum pellet used in capacitors, etc., and a process for manufacturing same, and a capacitor.

TECHNICAL BACKGROUND

Tantalum electrolytic capacitors are widely used in electronic equipment because they can be easily miniaturized. An anode for a tantalum electrolytic capacitor is obtained by molding agglomerated particles of tantalum into a porous tantalum pellet and oxidizing the surface of the tantalum pellet to produce a dielectric oxide film. A tantalum electrolytic capacitor is then obtained by filling this anode with solid electrolyte and connecting a cathode to the impregnated solid electrolyte.

A process in which secondary particles of tantalum (secondary particles of tantalum resulting from agglomeration of primary particles, i.e. the smallest unit particles) are fabricated by tantalum salt reduction, e.g. using the regular melt reduction process, etc., and agglomerated particles of tantalum (tertiary particles of tantalum) are subsequently obtained by subjecting the secondary particles of tantalum to further agglomeration in a separate step has been proposed as a process for manufacturing agglomerated particles of tantalum intended for use in tantalum electrolytic capacitors. In order to address the miniaturization of capacitors that has occurred in recent years, there is a need for spheroidal particles with a small particle size that can be utilized as agglomerated tantalum particles for use in capacitors.

A process for obtaining agglomerated particles of tantalum from secondary particles of tantalum has been disclosed, for example, in Patent Document 1 wherein, after introducing water into a tantalum micropowder containing at least 50 wt % of particles with a grain size of 325 mesh or less, the powder is dehydrated to a moisture content of 2-30 wt %, dried in a stationary state, and heat treated in a vacuum.

Patent Document 2 discloses a process in which tantalum particles that have been pulverized to a median diameter ($D_{50}$) of 50 μm or less in a granulating machine are wetted with a volatile liquid and granulated to form pre-granulated particles. Then, after drying in a stationary state, these pre-granulated particles are heat treated and classified by screening.

Patent Document 3 discloses a process in which tantalum particles are wetted and the resultant wetted particles are compacted and dried to form a cake and, after heat treatment, the cake is subjected to pulverizing, crushing, grinding, etc.

As mentioned earlier, in order to address the miniaturization of capacitors that has occurred in recent years, there is a need for spheroidal particles with a small particle size for use as agglomerated tantalum particles in capacitors. As far as primary tantalum particles are concerned, particles with a small particle size are required because they can increase the surface area of the tantalum pellet and can raise the electrical capacitance of the capacitor.

In addition, the agglomerated particles of tantalum have to be spheroidal particles with a narrow particle size distribution because they can increase the diameter of the voids in the tantalum pellet and improve the fill properties of the solid electrolyte.

Furthermore, the agglomerated particles of tantalum have to be particles with a low bulk density because they afford a high rate of compression during tantalum pellet molding and facilitate molding in predetermined shapes.

However, such low-bulk-density spheroidal agglomerated particles of tantalum with a small particle size and a narrow particle size distribution were not obtained in the manufacturing processes set forth in Patent Documents 1-3.

In addition, in the manufacturing processes for agglomerated particles of tantalum set forth in Patent Documents 1-3, attempts to reduce the mean particle size led to the formation of micro-particles with a size of several μm. For this reason, the particles had low flowability and could not be easily charged into the mold. In addition, the micro-particles generated in the course of manufacture or micro-particles generated subsequently by peeling, etc., used to get stuck in the gap between the female mold and the sides of the male mold, thereby making it impossible to extract the male mold from the female mold. Consequently, problems were likely to arise during pelletizing when sintered tantalum bodies were fabricated. Furthermore, due to the reduced porosity of the pellets made from the resultant agglomerated particles of tantalum, it was difficult to reduce the anode resistance of the anodes made from the pellets by impregnating them with a sufficient amount of solid electrolyte.

In this connection, the present applicants have proposed a process which involves, first of all, obtaining a granulated powder by combining a step of stirring while adding water with a subsequent step of stirring without adding water in a granulating apparatus, and then drying and sintering the powder (Patent Document 4).

In this process, micro-particles with a size of several μm are unlikely to be generated because of the high particle strength. For this reason, the powder has high flowability and can be easily charged into the mold. In addition, the problems associated with extracting the male mold from the female mold are also less likely to occur. Furthermore, pellets made from the resultant agglomerated particles of tantalum have sufficient porosity and, therefore, anodes can be easily impregnated with a sufficient amount of solid electrolyte and the anode resistance can easily be reduced.

However, upon further investigation, the present inventors found that the electrostatic capacitance per unit volume in pellets made from the agglomerated particles of tantalum obtained by this manufacturing process could sometimes be insufficient.

PRIOR ART LITERATURE

Patent Documents

Patent Document 1: Japanese Patent Pub. No. 2089652.
Patent Document 2: Specification of U.S. Patent Application Pub. No. 2007/0068341.

Patent Document 3: Japanese translation of PCT International Application Pub. No. 2002-516385

Patent Document 4: Japanese Patent Application 2007-273684 (Japanese Laid-Open Patent Application Pub. No. 2009-102680).

SUMMARY OF THE INVENTION

Problems to be Solved by the Invention

The present invention, which was made with the above-described circumstances in mind, aims to provide a manufacturing process for agglomerated particles of tantalum that is capable of producing low-bulk-density spheroidal agglomerated particles of tantalum with a small particle size and a narrow particle size distribution. In addition, it aims to provide a high-surface-area porous tantalum pellet with large-diameter voids. Furthermore, it aims to provide a capacitor of high electrical capacitance.

In addition, it aims to provide agglomerated particles of tantalum (mixed tantalum powder) and a tantalum pellet that present minimal problems in terms of pellet molding and, furthermore, permit fabrication of anodes capable of being impregnated with a sufficient amount of solid electrolyte and make it possible to raise the electrostatic capacitance per unit volume of the capacitor.

Means for Solving the Problems

The inventive process for manufacturing agglomerated particles of tantalum comprises the steps of obtaining hydrated aggregates by pulverizing secondary particles of tantalum obtained by tantalum salt reduction and adding water thereto; obtaining dry aggregates by drying the hydrated aggregates; obtaining spheronized particles by passing the dry aggregates through screens; and heat treating the spheronized particles.

In the inventive process for manufacturing agglomerated particles of tantalum, secondary particles of tantalum obtained by a melt reduction of potassium fluorotantalate or secondary particles of tantalum obtained by a sodium reduction of tantalum chloride in the vapor phase may be used as the secondary particles of tantalum.

Prior to the step of heat treating the spheronized particles, the screened powder may be vibrated or rolled on a plate.

Furthermore, a step may be included in which the heat-treated spheronized particles are deoxidized.

A first aspect of the inventive tantalum pellet is obtained by molding agglomerated particles of tantalum in accordance with the inventive process for manufacturing agglomerated particles of tantalum.

It should be noted that the first aspect of the inventive tantalum pellet may employ compacts of the agglomerated particles of tantalum or sintered bodies obtained by sintering the compacts.

The inventive capacitor is manufactured using the first aspect of the inventive tantalum pellet.

In addition, the present inventors investigated the reasons for the insufficient electrostatic capacitance per unit volume in pellets produced from agglomerated particles of tantalum made by the manufacturing process of Patent Document 4. As a result, it was found that, during pellet molding, excessively high particle strength led to the formation of excess space that did not contribute to electrostatic capacitance.

However, upon further investigation, the present inventors contemplated mixing agglomerated particles of tantalum of somewhat lower particle strength with high-strength agglomerated particles of tantalum, such as the ones made by the manufacturing process of Patent Document 4.

The inventive process for manufacturing a mixed tantalum powder includes the steps of: obtaining agglomerated tantalum particles (X) using the manufacturing process (a) described below; obtaining agglomerated tantalum particles (Y) using any manufacturing process selected from the manufacturing processes (b)-(d) described below; and mixing the obtained agglomerated tantalum particles (X) with agglomerated tantalum particles (Y).

Manufacturing process (a) is a process for manufacturing agglomerated particles of tantalum comprising the steps of: obtaining hydrated aggregates by stirring secondary particles of tantalum produced by tantalum salt reduction while adding water thereto in a granulating apparatus having a low-speed impeller and a high-speed impeller rotating at a rotational speed that is at least 10 times higher than that of the low-speed impeller; further stirring the hydrated aggregates in the granulating apparatus without adding water; and, after that, obtaining dry aggregates by drying the hydrated aggregates, and sintering the dry aggregates.

Manufacturing process (b) is a process for manufacturing agglomerated particles of tantalum comprising the steps of: obtaining hydrated aggregates by stirring secondary particles of tantalum produced by tantalum salt reduction while adding water thereto in a granulating apparatus having a low-speed impeller and a high-speed impeller rotating at a rotational speed that is at least 10 times higher than that of the low-speed impeller; and, after that, obtaining dry aggregates by drying the hydrated aggregates; spheronizing the dry aggregates by passing them through screens; and sintering the spheronized dry aggregates.

Manufacturing process (c) is a process for manufacturing agglomerated particles of tantalum comprising the steps of: obtaining hydrated aggregates by adding water to secondary particles of tantalum produced by tantalum salt reduction and pulverizing them in a pulverizing machine other than the granulating apparatus mentioned above (excluding machines that correspond to the granulating apparatus); and, after that, obtaining dry aggregates by drying the hydrated aggregates; spheronizing the dry aggregates by passing them through screens; and sintering the spheronized dry aggregates.

Manufacturing process (d) is a process for manufacturing agglomerated particles of tantalum comprising the steps of: obtaining hydrated aggregates by adding water to secondary particles of tantalum obtained by tantalum salt reduction; obtaining dry aggregates by drying the hydrated aggregates; obtaining sintered aggregates by sintering the dry aggregates; and micronizing the sintered aggregates.

In the inventive process for manufacturing a mixed tantalum powder, the step of obtaining agglomerated tantalum particles (Y) is the manufacturing process (b) described above. In addition, in the step of obtaining hydrated aggregates in the manufacturing process (b), the operation of stirring in the granulating apparatus may be accomplished simultaneously with the addition of water.

A deoxidation treatment step may be included after the step of mixing agglomerated tantalum particles (X) with agglomerated tantalum particles (Y).

Either one or both of the steps of deoxidizing agglomerated tantalum particles (X) and deoxidizing agglomerated tantalum particles (Y) may be included prior to the step of mixing agglomerated tantalum particles (X) with agglomerated tantalum particles (Y).

The inventive mixed tantalum powder contains a mixture of the following agglomerated tantalum particles (X) and agglomerated tantalum particles (Y).

Agglomerated tantalum particles (X) are agglomerated particles of tantalum, in which the cumulative fraction of particles with a particle size of 3 μm or less 10 minutes after irradiation with 25-Watt ultrasound is 5 wt % or less.

Agglomerated tantalum particles (Y) are agglomerated particles of tantalum in which the cumulative fraction of particles with a particle size of 3 μm or less 10 minutes after irradiation with 25-Watt ultrasound is 10 wt % or more.

The inventive process for manufacturing tantalum pellets consists in molding a mixed tantalum powder produced in accordance with the inventive process for manufacturing a mixed tantalum powder.

A second aspect of the inventive tantalum pellet is obtained by molding the inventive mixed tantalum powder.

It should be noted that the second aspect of the inventive tantalum pellet may employ compacts of the mixed tantalum powder or sintered bodies obtained by sintering the compacts.

Effects of the Invention

The inventive process for manufacturing agglomerated particles of tantalum makes it possible to manufacture low-bulk-density spheroidal agglomerated particles of tantalum with a small particle size and a narrow particle size distribution.

The first aspect of the inventive tantalum pellet is a high-surface-area porous pellet with large-diameter voids. The large surface area can contribute to increasing the electrical capacitance of the capacitor.

The inventive capacitor can provide a high electrical capacitance.

In addition, the second aspect of the inventive tantalum pellet and agglomerated particles of tantalum (mixed tantalum powder) presents minimal problems in terms of pellet molding and, furthermore, permits fabrication of anodes capable of being impregnated with a sufficient amount of solid electrolyte and makes it possible to raise the electrostatic capacitance per unit volume of the capacitor.

BRIEF DESCRIPTION OF THE DRAWINGS

FIG. 1 is a schematic diagram illustrating an exemplary melt reaction apparatus.

FIG. 2 is a schematic diagram illustrating an exemplary vapor phase reaction apparatus.

FIG. 3 is a schematic diagram illustrating an exemplary granulating apparatus.

FIG. 4 is a schematic diagram illustrating another exemplary granulating apparatus.

FIG. 5 is a schematic diagram illustrating another exemplary granulating apparatus.

FIG. 6 is a diagram illustrating the particle size distribution curves of Working Examples 1-1-1-3.

FIG. 7 is a diagram illustrating the particle size distribution curves of Working Examples 1-4-1-6.

FIG. 8 is a diagram illustrating the particle size distribution curves of Working Examples 1-7-1-9.

FIG. 9 is a diagram illustrating the particle size distribution curves of Working Examples 1-10-1-12.

FIG. 10 is a diagram illustrating the particle size distribution curve of Comparative Example 1-1.

FIG. 11 is a diagram illustrating the particle size distribution curves of Working Examples 1-13-1-15.

FIG. 12 is a diagram illustrating the particle size distribution curves of Working Examples 1-16-1-18.

FIG. 13 is a diagram illustrating the particle size distribution curves of Working Examples 1-19-1-22.

FIG. 14 is a diagram illustrating the particle size distribution curves of Working Examples 1-23-1-25 and Comparative Example 1-2.

FIG. 15 is a diagram illustrating the particle size distribution curve of the powder of Experimental Example 2-1.

FIG. 16 is a diagram illustrating the particle size distribution curve of the powder of Experimental Example 2-5.

FIG. 17 is a diagram illustrating the pore size distribution of the tantalum pellets of Experimental Examples 2-1-2-5.

MODES FOR CARRYING OUT THE INVENTION

Embodiment 1: Process for Manufacturing Agglomerated Particles of Tantalum

An embodiment of the inventive process for manufacturing agglomerated particles of tantalum is described below.

The process for manufacturing agglomerated particles of tantalum of this embodiment comprises the steps of aggregation, drying, spheronization, and heat treatment. Furthermore, after the heat treatment step, it is desirable to include a deoxidation step.

The steps are described below.

Aggregation Step: In the aggregation step, secondary particles of tantalum produced by tantalum salt reduction are pulverized and hydrated aggregates are obtained by adding water thereto.

Secondary particles of tantalum obtained by a melt reduction of potassium fluorotantalate ($K_2TaF_7$) (hereinafter referred to as "melt-reduced secondary particles of tantalum") or secondary particles of tantalum obtained by a sodium reduction of tantalum in the vapor phase (hereinafter referred to as "vapor phase-reduced secondary particles of tantalum") are suggested as the secondary particles of tantalum produced by tantalum salt reduction.

Melt-Reduced Secondary Particles of Tantalum: The melt-reduced secondary particles of tantalum are obtained in a process involving reducing potassium fluorotantalate ($K_2TaF_7$) with sodium in molten salt to produce secondary particles that are agglomerates of primary particles and then water-washing, acid-washing, and drying these secondary particles.

The melt reaction apparatus 30 illustrated in FIG. 1 is an example of the equipment used to obtain melt-reduced secondary particles of tantalum.

This melt reaction apparatus 30 comprises a reactor 31, a potassium fluorotantalate supply conduit 32 and a sodium supply conduit 33 provided at the upper end 31a of the reactor 31, a stirrer 34 used for stirring the contents inside the reactor 31, and a heater 35 used for heating the reactor 31.

The process for manufacturing melt-reduced secondary particles of tantalum using the above-described melt reaction apparatus 30 starts with charging the raw material components of the molten salt into the reactor 31. Eutectic salts of potassium chloride (KCl) and potassium fluoride (KF), and eutectic salts of potassium chloride (KCl) and sodium chloride (NaCl), etc., are suggested as the raw material components of the molten salt.

Next, the reactor 31 is heated, preferably to 800-900° C., with the help of the heater 35 and a molten salt is obtained by melting the above-described molten salt raw material components. After that, solid potassium fluorotantalate is supplied into the reactor 31 through the potassium fluorotantalate supply conduit 32 and solid sodium is supplied into the reactor 31 through sodium supply conduit 33 while the molten salt is stirred by the stirrer 34.

It is preferable to add both potassium fluorotantalate and sodium in a continuous manner because the melt-reduced secondary particles of tantalum can then be easily produced. In particular, it is even more preferable to introduce small portions of the potassium fluorotantalate and sodium into the molten salt in an alternating manner and allow them to react with each other.

In addition, the amount of the molten salt immediately prior to the addition of sodium is preferably 40-1000 times, and even more preferably 200-400 times, greater than the amount of potassium fluorotantalate in the molten salt. When the amount of the molten salt is less than 40 times that of potassium fluorotantalate, the micronization of the primary particles of tantalum tends to become difficult. When the amount of the molten salt exceeds 1000 times that of potassium fluorotantalate, the yields and production efficiency tend to decrease.

After reacting potassium fluorotantalate with sodium, the molten salt is cooled. Secondary particles of tantalum are obtained by removing the thus-obtained agglomerates from the reactor 31, removing the molten salt and impurities by water-washing and acid-washing, and drying. Mineral acids such as nitric acid, hydrochloric acid, and hydrofluoric acid and aqueous hydrogen peroxide are suggested as the acids used for acid-washing.

The drying temperature used for drying the particles is preferably 80-150° C. If the drying temperature is 80° C. or higher, the particles can be dried to a sufficient degree within a short period of time, and energy consumption during drying can be reduced if it is not higher than 150° C.

The melt-reduced secondary particles of tantalum normally have a bulk density of 0.4-0.9 g/cm$^3$ and a BET specific surface area of 4.0-6.5 m$^2$/g. As used herein, the BET specific surface area is a value measured by nitrogen gas adsorption.

Using secondary particles of tantalum with a bulk density of at least 0.4 g/cm$^3$ or a BET specific surface area of not more than 6.5 m$^2$/g makes it possible to easily reduce the particle size of the obtained agglomerated particles of tantalum. In addition, using secondary particles of tantalum with a bulk density of not more than 0.9 g/cm$^3$ or a BET specific surface area of at least 4.0 m$^2$/g makes it possible to easily reduce the bulk density of the obtained agglomerated particles of tantalum.

In terms of the particle size of the melt-reduced secondary particles of tantalum obtained after pulverizing, it is preferable to use a mode diameter (maximum frequency diameter) of 0.7-1.3 μm and a median diameter of 1-3 μm. As used herein, the particle size is a volume-mean particle size measured using the laser diffraction and scattering technique.

The bulk density of the obtained agglomerated particles of tantalum can be reduced if the mode diameter of the melt-reduced secondary particles of tantalum is at least 0.7 μm or if their median diameter is at least 1 micron. The particle size of the obtained agglomerated particles of tantalum can easily be reduced if their mode diameter is not more than 1.3 μm or if their median diameter is not more than 3 μm.

Although the particle size of the melt-reduced secondary particles of tantalum changes depending on the adjustment conditions used for the primary particles of tantalum and the stirring speed used for the molten salt and water/acid washing, etc., adjusting it using these conditions is not easy.

It should be noted that the particle size of the primary particles of tantalum can be adjusted, for example, by varying the amount of the molten salt and reaction temperature used to obtain the melt-reduced secondary particles of tantalum. The larger the amount of the molten salt and the lower the reaction temperature, the smaller the particle size of the obtained primary particles of tantalum.

Vapor Phase-Reduced Secondary Particles of Tantalum:
The vapor phase-reduced secondary particles of tantalum are obtained by contacting and reacting vaporized tantalum chloride with vaporized sodium.

These vapor phase-reduced secondary particles of tantalum are composed of multiple primary particles of tantalum formed by the reaction between tantalum chloride and sodium that are encased in the sodium chloride produced by this reaction. The volume-mean particle size of the primary particles of tantalum is 20-30 nm.

The vapor phase reaction apparatus 40 illustrated in FIG. 2 is an example of the equipment used to obtain vapor phase-reduced secondary particles of tantalum.

This vapor phase reaction apparatus 40 comprises a reactor 41; a tantalum chloride supply conduit 42, a sodium supply conduit 43, and an inert gas supply conduit 44 provided at the upper end 41*a* of the reactor 41; a withdrawal conduit 45 connected to the lower end of the reactor 41, a heater 46 used for heating the entire reactor 41; and an exhaust gas conduit 47 used to discharge exhaust gas from inside the bottom portion of the reactor 41 out of the heater 46.

The reactor 41 is a funnel-shaped vessel with a cylindrical body 41*c* and a tapered portion 41*d* located underneath the cylindrical body 41*c*. The thus configured reactor 41 is designed such that the vapor phase-reduced secondary particles of tantalum produced in the cylindrical body 41*c* accumulate in the tapered portion 41*d*.

The tantalum chloride supply conduit 42, sodium supply conduit 43, and inert gas supply conduit 44 form a round concentric triple tube, in which the tantalum chloride supply conduit 42 is disposed on the innermost side, the inert gas supply conduit 44 is disposed on the outside of the tantalum chloride supply conduit 42, and the sodium supply conduit 43 is disposed on the outermost side. As a result of such an arrangement, rapid and violent reactions between tantalum chloride and sodium are minimized by supplying an inert gas between tantalum chloride and sodium.

In the process for manufacturing vapor phase-reduced secondary particles of tantalum using the above-described vapor phase reaction apparatus 40, tantalum chloride (boiling point: 242° C.) is vaporized by heating and this vaporized tantalum chloride is then supplied to the reactor 41 through the tantalum chloride supply conduit 42. In addition, sodium (boiling point: 883° C.) is vaporized by heating and this vaporized sodium is then supplied to the reactor 41 through the sodium supply conduit 43. In addition, an inert gas such as argon etc. is supplied to the reactor 41 through the inert gas supply conduit 44.

Although at such time the weight ratio of tantalum chloride to sodium (tantalum chloride/sodium) is set to a value equivalent to the stoichiometric ratio (3.1:1), it is preferable to use a slightly higher amount of sodium.

In addition, the tantalum chloride supplied through the tantalum chloride supply conduit 42 may be diluted with an inert gas and the sodium supplied through the sodium supply conduit 43 may also be diluted with an inert gas. The diluent inert gas may be the same, or different from, the inert gas supplied through the inert gas supply conduit 44.

Next, the tantalum chloride and sodium supplied to the reactor 41, while still in a vaporized state, are reacted at, for example, 700-900° C., inside the cylindrical body 41c of the reactor 41 heated by the heater 46.

At first, this reaction forms primary particles of tantalum. Then these multiple primary particles of tantalum are encapsulated in the sodium chloride produced by the reaction between tantalum chloride and sodium, thereby forming vapor phase-reduced secondary particles of tantalum.

The formed vapor phase-reduced secondary particles of tantalum drop into and accumulate in the tapered portion 41d of the reactor 41, from which they are removed through the withdrawal conduit 45. In addition, unreacted tantalum chloride, unreacted sodium, and inert gases are discharged from the reactor 41 through the exhaust gas conduit 47.

The vapor phase-reduced secondary particles of tantalum normally have a bulk density of 0.5-1.2 g/cm$^3$ and a BET specific surface area of 6-18 m$^2$/g.

In terms of the particle size of the vapor phase-reduced secondary particles of tantalum obtained after pulverizing, it is preferable to use a mode diameter (maximum frequency diameter) of 0.5-1.3 μm and a median diameter of 0.4-1.2 μm.

The physical particulate characteristics (particle size, bulk density, and specific surface area) of the vapor phase-reduced secondary particles of tantalum can be adjusted by changing the flow rate of tantalum chloride, the flow rate of sodium, the flow rate of the inert gas, and the temperature of the reactor, etc., in the above-described manufacturing process. For example, the specific surface area can be adjusted and reduced by increasing the flow rate of tantalum chloride and the flow rate of sodium.

Pulverization: Methods involving stirring in a granulating apparatus, or methods employing pulverizing machines, etc., can be suggested as methods for pulverizing the above-described secondary particles of tantalum.

When melt-reduced secondary particles of tantalum are used as the secondary particles of tantalum, either a granulating apparatus or a pulverizing machine can be used. A granulating apparatus, however, is preferable from the standpoint of facilitating the production of the target agglomerated particles of tantalum.

When vapor phase-reduced secondary particles of tantalum are used as the secondary particles of tantalum, a granulating apparatus is used in order to ensure that the obtained agglomerated particles of tantalum have sufficient strength.

The particle size of the secondary particles of tantalum is adjusted in the process of pulverizing. If the pulverizing process is more intense or if pulverization is conducted for a longer time, the particle size becomes smaller.

The term "granulating apparatus" refers to an apparatus equipped with one or more low-speed impellers used for stirring secondary particles of tantalum and one or more high-speed impellers rotating at a rotational speed that is at least 10 times higher than that of the low-speed impellers. From a practical point of view, the rotational speed of the high-speed impellers is preferably at least 30 times higher, and even more preferably, at least 100 times higher than the rotational speed of the low-speed impellers. In addition, it is preferably not more than 1000 times higher than the rotational speed of the low-speed impellers. Specifically, it is set to approximately 6000 RPM.

For example, a Spartan Granulator from Fuji Paudal Co., Ltd., such as the one illustrated in FIG. 3, which is equipped with a cylindrical vessel 11, a low-speed impeller 12 that rotates along the interior peripheral walls of the vessel 11, a high-speed impeller 13 that rotates at a rotational speed higher than that of the low-speed impeller 12 at the center of the vessel 11, and a sprayer 14 that sprays water inside the vessel 11, is suggested as the granulating apparatus.

The rotational speed of the low-speed impeller 12 is preferably 13-27 RPM. If the rotational speed of the low-speed impeller 12 is 13 RPM or higher, such a rotational speed will be sufficient for supplying the secondary particles of tantalum being granulated to the high-speed impeller while stirring them, and a speed of not more than 27 RPM can prevent unnecessary stirring of the secondary particles of tantalum that undergo granulation.

The rotational speed of the high-speed impeller 13 is preferably 750-6200 RPM. If the rotational speed of the high-speed impeller 13 is 750 RPM or higher, the secondary particles of tantalum can be pulverized to a sufficient degree. However, there is no advantage to increasing the rotational speed beyond 6200 RPM because this does not change the degree of pulverization.

In addition, a "High Flex Gral" from Fukae Powtec Co., Ltd., such as the one illustrated in FIG. 4, which is equipped with a cylindrical vessel 21; a low-speed impeller 22 installed adjacent the bottom surface of the vessel 21 and equipped with multiple rotary blades 22b attached to a rotary shaft 22a arranged in the vertical direction; a high-speed impeller 23 installed above the low-speed impeller 22 and equipped with multiple stirrer blades 23b attached to a rotary shaft 23a arranged in the diametrical direction of the vessel 21; and a sprayer 24 spraying water inside the vessel 21 is suggested as the granulating apparatus. It should be noted that the high-speed impeller 23 is adapted to rotate at a rotational speed that is higher than that of the low-speed impeller 22.

The rotational speed of the low-speed impeller 22 is preferably 100-300 RPM. If the rotational speed of the low-speed impeller 22 is 100 RPM or higher, such a rotational speed will be sufficient for supplying the secondary tantalum particles being granulated to the high-speed impeller while stirring them, and a speed of not more than 300 RPM can prevent unnecessary stirring of the secondary tantalum particles undergoing granulation.

The rotational speed of the high-speed impeller 23 is preferably 1500-6000 RPM. If the rotational speed of the high-speed impeller 23 is 1500 RPM or higher, the secondary particles of tantalum can be pulverized to a sufficient degree. However, there is no advantage to increasing the rotational speed beyond 6000 RPM because this does not change the degree of pulverization.

The pulverizing machine is any apparatus possessing a pulverizing capability, with the exception of the aforementioned granulating apparatus.

Ball mills, chopper mills, speed mills, jaw crushers, cutter mills, screen mills, jet mills, etc., are suggested as examples of pulverizing machines.

Addition of Water: Water is added before, during, or after pulverization. The added water acts as a binder. The bulk density of the obtained agglomerated particles of tantalum can be adjusted by changing the amount of water added at such time. The preferred amount of added water that is capable of lowering bulk density varies depending on the type of secondary particles of tantalum and the granulating apparatus or pulverizing machine used.

The addition of phosphorus and boron, etc., to the added water is preferable, and the addition of phosphorus is especially preferable because it allows for a high surface area to be maintained by minimizing the fusion and growth of the primary particles in the drying step. Phosphoric acid, ammonium hexafluorophosphate, and the like are suggested as the forms of phosphorus.

If the amount of the secondary particles of tantalum used is 100 wt %, the amount of the added phosphorus or boron is preferably 0.01-0.03 wt % (100-300 ppm). If the amount of the added phosphorus or boron is 0.01 wt % or higher, the fusion of the primary particles can be sufficiently minimized, and if it is 0.03 wt % or lower, degradation in the performance of capacitors obtained from the resultant agglomerated particles of tantalum can be prevented.

A method involving addition of water while stirring the pulverized material in the above-described granulating apparatus, a method involving removal of excess supernatant after causing the pulverized powder to sink in water, a method involving mixing water with the pulverized powder, and the like are suggested as the methods of water addition.

When a granulating apparatus is used, one to several dozen hydrated aggregates are formed by the addition of water. While their specific number varies depending on the amount of the pulverized secondary particles of tantalum used, most of the pulverized material is turned into hydrated aggregates. The pulverized material adhered to the walls etc. of the apparatus without forming hydrated aggregates can be recovered and recycled by mixing it "as is" with the pulverized material again.

The resultant hydrated aggregates are coarse particles with a particle size of 2-10 cm. In the case of particles with a particle size of less than 2 cm, it is difficult to obtain the target agglomerated particles of tantalum, and it is substantially impossible to obtain coarse particles with a particle size exceeding 10 cm.

When vapor phase-reduced secondary particles of tantalum are used as the secondary particles of tantalum, it is preferable to use a granulating apparatus for water addition in order to ensure that the obtained agglomerated particles of tantalum have sufficient strength.

Drying Step: In the drying step, dry aggregates are obtained by drying the hydrated aggregates.

In the drying step, it is preferable to set the moisture content of the dry aggregates to not more than 1.0 wt % because this facilitates the production of the target agglomerated particles of tantalum. In addition, setting it to 0.3 wt % or more is preferable in terms of reducing the drying time. In addition, adjusting it to a moisture content of 0.5-1.5 $mg/m^2$ is preferable in terms of moisture content per unit surface area.

The heat drying process, vacuum drying process, vacuum heat drying process, and the like can be utilized as the drying methods. Among these, the vacuum drying process and vacuum heat drying process are preferred because they permit sufficient drying.

The drying temperature used for drying is preferably 80-120° C. If the drying temperature is 80° C. or higher, the particles can be dried to a sufficient degree within a short period of time, and if the drying temperature is 120° C. or lower, the obtained dry aggregates can be readily de-agglomerated.

Spheronization Step: In the spheronization step, spheronized particles are obtained by passing the dry aggregates obtained in the drying step through screens and de-agglomerating them.

A batch-type screen is used. Normally, the screen is vibrated in the horizontal or vertical direction and moved in a circular manner, thereby causing the dry aggregates to fall through.

For example, a mesh or a sheet of perforated metal, etc., can be used as a screen. A single-stage screen or stacked multiple-stage screens may be used.

Passage-assisting balls are preferably deposited on top of the screen. When deposited on top of the screen, the passage-assisting balls bounce on the screen, which makes it possible to increase the vibration of the screen and thus reduce the time it takes the dry aggregates to pass through the screen.

A screen with an opening surface area selected in accordance with the target particle size distribution is used in the spheronization step. The volume-mean particle size of agglomerated particles of tantalum intended for use in capacitors is preferably 20-100 μm. When the volume-mean particle size of all the agglomerated particles of tantalum is set to 100 μm or less, it is preferable to use a mesh with openings of not more than 75 μm. In addition, when the volume-mean particle size of all the agglomerated particles of tantalum is set to 20 μm or more, it is preferable to use a mesh with openings of at least 33 μm.

If there remain any dry aggregates that have not been de-agglomerated in the spheronization step, they can be recycled as secondary tantalum particles for use in the aggregation step.

In addition, when the screens in the spheronization step are configured in a multi-stage manner, the screen passage time of the dry aggregates varies depending on the opening surface area of the selected screen. Therefore, the screen passage time of the dry aggregates can be reduced by appropriately combining the screens that are used. For example, a combination of 60 mesh, 100 mesh, 160 mesh, and 200 mesh, etc., can be employed as a screen combination capable of reducing the screen passage time of the dry aggregates.

Before heat treating the spheronized particles, it is preferable to vibrate or roll the screened powder on a plate because this allows for more spheronized particles to be obtained in the spheronization step.

A method in which the powder is vibrated on a plate in the horizontal or vertical direction is suggested as the method for vibrating the screened powder on a plate.

A method in which the plate is rotated about its center of gravity and a method in which the plate is moved in a circular manner are suggested as the methods for rolling the screened powder on a plate. Although the plate may be disposed either horizontally or at a slant with respect to the horizontal direction when the flat plate is rotated, the horizontal arrangement is preferable because it makes it possible to reduce the crushing of the screened powder as a result of mutual contact.

Although the plate used at such time may be, for example, a flat plate, a spherically concave plate, or a curved plate, etc., a flat plate is preferred because it makes it possible to reduce the crushing of the screened powder as a result of mutual contact. A side plate may be installed in order to prevent the screened powder from spilling over the edges of the plate while being vibrated or rolled.

In addition, the bottom surface of the receptacle used to hold the screened powder may be utilized as such a plate.

When the bottom surface of the receptacle is utilized, the powder screened using the vibration and circular motion of the screen can be spheronized on the bottom surface of the receptacle while simultaneously passing the dry aggregates through the screen and de-agglomerating them.

In the spheronization step, the screened powder is unlikely to be pulverized and the as-screened particle size can be maintained practically intact. Fines with a particle size of less than 10 μm are especially unlikely to be formed. This is believed to be due to the absence of strong shearing forces applied during vibration and rolling to the screened powder as happens during stirring. Furthermore, no bonding between the particles of the screened powder is likely to occur either. This is believed to be due to the absence of collisions involving powerful impact forces between the particles of the screened powder during vibration and rolling and, moreover, due to the dry state of the screened powder. Thus, in the spheronization step, the screened powder undergoes deformation that eliminates corners without significantly changing the particle size, thereby allowing for spheronized particles of a uniform particle size to be formed in accordance with the opening surface area of the screen.

It should be noted that while, as described above, fines with a particle size of less than 10 micron are unlikely to be formed in the spheronization step, when such fines are formed, the fines can be removed by screening. The removed fines can be recycled as secondary tantalum particles for use in the aggregation step.

The above-described operations of screening and vibration/rolling on a plate may each be performed either multiple times in an alternating manner or only once.

When the operations of screening and vibration or rolling on a plate are performed in an alternating manner multiple times, a method is employed in which, for example, in each de-agglomeration step, dry aggregates or a powder that has been passed through a previous screen are passed through screens placed on top of a receptacle and the powder that passes through the screen on the receptacle is rolled or vibrated in the receptacle. If a single-stage screen is utilized in each de-agglomeration step, from the standpoint of efficient particle size reduction it is preferable to use the largest possible opening surface area for the screen used in the first de-agglomeration step and then successively reduce the opening surface area of the screens utilized in the second and subsequent de-agglomeration steps.

When the operations of screening and vibration or rolling on a plate are performed only once, a method is employed in which, for example, dry aggregates are passed through screens placed on top of a receptacle in a multi-stage configuration and the powder that passes through the screens on the receptacle is rolled or vibrated in the receptacle. When a multi-stage screen is used, from the standpoint of efficient particle size reduction it is preferable to dispose the screens such that the opening surface area becomes progressively smaller in each lower stage.

Heat Treatment Step: In the heat treatment step, the spheronized particles obtained in the spheronization step are heated.

The heat treatment temperature used for the spheronized particles in the heat treatment step is preferably 800-1250° C. If the heat treatment temperature is 800° C. or higher, the particles can be sintered to a sufficient degree within a short period of time. However, if the heat treatment temperature exceeds 1250° C., unnecessary heating leads to coarsening as well as a waste of energy.

The duration of heat treatment is preferably 10 minutes to 2 hours. If the heat treatment time is 10 minutes or more, the particles can be sintered to a sufficient degree. When the heat treatment time is 2 hours, the sintering process is practically complete and there is no advantage to spending any more time.

Deoxidation Step: In the deoxidation step, the spheronized particles heat treated in the heat treatment step are deoxidized. For example, a method, in which a reducing agent such as magnesium etc. is added to the heat treated spheronized particles and the particles are heated at a temperature above the melting point and below the boiling point of the reducing agent in an inert gas atmosphere such as argon or in a vacuum, is suggested as a method of deoxidation treatment.

Although the deoxidation treatment may be conducted only once, it is preferable to repeat it multiple times, and performing it twice is even more preferable.

Accomplishing the above steps makes it possible to obtain low-bulk-density agglomerated particles of tantalum with a small particle size and a narrow particle size distribution.

The mode diameter of the obtained agglomerated particles of tantalum is preferably 15-80 μm. If the mode diameter of the agglomerated particles of tantalum is not less than 15 μm and not more than 80 μm, they are suitable for use in capacitors.

In addition, the bulk density of the agglomerated particles of tantalum is preferably 1-2.5 g/cm$^3$. If the bulk density of the agglomerated particles of tantalum is 1 g/cm$^3$ or higher, sufficient loading can be ensured during tantalum pellet molding. If the bulk density of the agglomerated particles of tantalum is not more than 2.5 g/cm$^3$, a sufficient rate of compression can be ensured during tantalum pellet molding.

It should be noted that the process for manufacturing the agglomerated particles of tantalum of this embodiment is not limited to the above-described embodiment and, for example, may permit omission of the deoxidation step. However, it is preferable to perform the deoxidation step because it renders the product suitable for use in capacitors.

Tantalum Pellets: The tantalum pellets of this embodiment are obtained by molding agglomerated particles of tantalum manufactured in accordance with the above-described process for manufacturing agglomerated particles of tantalum.

For example, a process in which a binder such as camphor ($C_{10}H_{16}O$) and the like is added to the agglomerated particles of tantalum as needed in the amount of 3-5 wt % based on 100 wt % of the agglomerated tantalum particles and the mixture is charged into a form, compression-molded, and sintered by heating for 0.3-1 hours at 1000-1400° C. while still in a compressed state is suggested as the process for molding tantalum pellets. Such a molding method makes it possible to obtain tantalum pellets consisting of sintered porous bodies.

When a tantalum pellet obtained using the above-described molding process is employed as a capacitor anode, before the agglomerated particles of tantalum are compression-molded it is preferable to embed lead wires into the agglomerated particles of tantalum in order to integrate the lead wires into the tantalum pellet.

Due to the small particle size of the agglomerated particles of tantalum used in the molding of tantalum pellets, the tantalum pellet of this embodiment has a large surface area. Therefore, the electrical capacitance of the capacitors obtained from such tantalum pellets can be increased.

In addition, due to the narrow particle size distribution of the agglomerated particles of tantalum used in the molding of the tantalum pellet of this embodiment, the tantalum pellet of this embodiment has large-diameter voids. Therefore, it can be readily filled with a solid electrolyte when the capacitor is manufactured.

Furthermore, the agglomerated particles of tantalum used in the molding of the tantalum pellet of this embodiment exhibit low bulk density and a sufficient compression rate during molding. Therefore, the tantalum pellet of this embodiment can be readily molded into a predetermined shape.

Capacitor: The capacitor of this embodiment is manufactured using the above-described tantalum pellet. A capacitor equipped with an anode obtained by oxidizing the surface of the tantalum pellet, a cathode facing the anode, and a solid electrolyte layer disposed between the anode and cathode is suggested as an example of capacitors utilizing the above-described tantalum pellet.

A cathode terminal is connected to the cathode by soldering and the like. In addition, an exterior resin shell is formed around a member composed of the anode, cathode, and solid electrolyte layer.

Examples of materials used to form the cathode include graphite, silver, and the like.

Examples of materials used to form the solid electrolyte layer include manganese dioxide, lead oxide, electrically conductive polymers, and the like.

When oxidizing the surface of a tantalum pellet, it is suggested, for example, to use a method that involves treating the pellet for 1-3 hours in an electrolyte solution such as nitric acid, phosphoric acid and the like with a concentration of 0.1 wt % at a temperature of 30-90° C. by increasing the voltage to 20-60V at a current density of 40-80 mA/g. A dielectric oxide film is formed in the portion oxidized at such time.

As a result of using the above-described tantalum pellet, the capacitor of this embodiment has a large dielectric oxide film area and, in addition, is filled with a solid electrolyte to a sufficient degree. For this reason, it possesses high electrical capacitance.

Embodiment 2

The process for manufacturing a mixed tantalum powder of this embodiment comprises the steps of: obtaining agglomerated tantalum particles (X) using the manufacturing process (a) described below; obtaining agglomerated tantalum particles (Y) using any manufacturing process selected from the manufacturing processes (b)-(d) described below; and mixing the obtained agglomerated tantalum particles (X) and agglomerated tantalum particles (Y).

In addition, the mixed tantalum powder of this embodiment contains a mixture of agglomerated tantalum particles (X) and agglomerated tantalum particles (Y).

Process for Manufacturing Agglomerated Tantalum Particles (X): The manufacturing process (a), which is used to obtain agglomerated tantalum particles (X), comprises the steps of: obtaining hydrated aggregates by adding water to secondary particles of tantalum and stirring the mixture in a granulating apparatus (hereinafter referred to as "Step (a1)"); further stirring the hydrated aggregates in the granulating apparatus without adding water (hereinafter referred to as "Step (a2)"); obtaining dry aggregates by drying the hydrated aggregates after Step (a2) (hereinafter referred to as "Step (a3)"); and sintering the dry aggregates (hereinafter referred to as "Step (a4)").

In addition, a step of pre-mixing the secondary particles of tantalum (hereinafter referred to as a "pre-mixing step") is preferably provided before Step (a1) in the manufacturing process (a) in order to pre-homogenize the secondary particles of tantalum.

In addition, a step of conducting deoxidation treatment (hereinafter referred to as a "deoxidation step") is preferably provided after Step (a4) in the manufacturing process (a).

The secondary particles of tantalum used as a raw material in the manufacturing process (a) and all the steps of the manufacturing process (a) are discussed below.

Secondary Particles of Tantalum: The secondary particles of tantalum used in Step (a1) are secondary particles of tantalum produced by tantalum salt reduction (particles agglomerated from primary particles obtained subsequent to tantalum salt reduction).

A process in which potassium fluorotantalate ($K_2TaF_7$) is reduced with sodium in molten salt (hereinafter referred to as the "melt reduction process") and a process in which tantalum chloride is reduced with sodium in the vapor phase (hereinafter referred to as the "vapor phase reduction process") are preferable as the processes used for manufacturing the secondary particles of tantalum. It should be noted that secondary particles of tantalum obtained by the melt reduction process are called "melt-reduced secondary particles of tantalum" and secondary particles of tantalum obtained by the vapor phase reduction process are called "vapor phase-reduced secondary particles of tantalum."

Melt-reduced secondary particles of tantalum are particularly preferable because of their superior granulation properties.

For example, the melt reaction apparatus 30 illustrated in FIG. 1 is used to obtain melt-reduced secondary particles of tantalum.

This melt reaction apparatus 30 comprises a reactor 31, a potassium fluorotantalate supply conduit 32 and a sodium supply conduit 33 provided at the upper end 31a of the reactor 31, a stirrer 34 used for stirring the contents inside the reactor 31, and a heater 35 used for heating the reactor 31.

The process for manufacturing melt-reduced secondary particles of tantalum using the above-described melt reaction apparatus 30 starts with charging the raw material components of the molten salt into the reactor 31. Eutectic salts of potassium chloride (KCl) and potassium fluoride (KF), and eutectic salts of potassium chloride (KCl) and sodium chloride (NaCl), etc., are suggested as the raw material components of the molten salt.

Next, the reactor 31 is heated, preferably to 800-900° C., with the help of the heater 35 and a molten salt is obtained by melting the above-described molten salt raw material components. After that, solid potassium fluorotantalate is supplied into the reactor 31 through the potassium fluorotantalate supply conduit 32 and solid sodium is supplied into the reactor 31 through sodium supply conduit 33 while the molten salt is stirred by the stirrer 34.

It is preferable to add both potassium fluorotantalate and sodium in a continuous manner because the melt-reduced secondary particles of tantalum can then be easily produced. In particular, it is even more preferable to introduce small portions of the potassium fluorotantalate and sodium into the molten salt in an alternating manner and allow them to react with each other.

In addition, the amount of the molten salt immediately prior to the addition of sodium is preferably 40-1000 times, and even more preferably 200-400 times, greater than the amount of potassium fluorotantalate in the molten salt. When the amount of molten salt is less than 40 times that of potassium fluorotantalate, the micronization of the primary particles of tantalum tends to become difficult. When the amount of molten salt exceeds 1000 times that of potassium fluorotantalate, the yields and production efficiency tend to decrease.

After reacting potassium fluorotantalate with sodium, the molten salt is cooled. Secondary particles of tantalum are obtained by removing the thus-obtained agglomerates from the reactor 31, removing the molten salt and impurities by water-washing and acid-washing, and drying. Mineral acids such as nitric acid, hydrochloric acid, and hydrofluoric acid and aqueous hydrogen peroxide are suggested as the acids used for acid-washing.

The drying temperature used for drying the particles is preferably 80-150° C. If the drying temperature is 80° C. or higher, the particles can be dried to a sufficient degree within a short period of time, and energy consumption during drying can be reduced if it is not higher than 150° C.

The melt-reduced secondary particles of tantalum normally have a bulk density of 0.4-0.9 g/cm$^3$ and a BET specific surface area of 4.0-6.5 m$^2$/g. As used herein, the BET specific surface area is a value measured by nitrogen gas adsorption.

Using secondary particles of tantalum with a bulk density of at least 0.4 g/cm$^3$ or a BET specific surface area of not more than 6.5 m$^2$/g makes it possible to easily reduce the particle size of the obtained agglomerated particles of tantalum. In addition, using secondary particles of tantalum with a bulk density of not more than 0.9 g/cm$^3$ or a BET specific surface area of at least 4.0 m$^2$/g makes it possible to easily reduce the bulk density of the obtained agglomerated particles of tantalum.

In terms of the particle size of the melt-reduced secondary particles of tantalum obtained after pulverizing, it is preferable to use a mode diameter (maximum frequency diameter) of 0.7-1.3 μm and a median diameter of 1-3 μm. As used herein, the particle size is a volume-mean particle size measured using the laser diffraction and scattering technique.

The bulk density of the obtained agglomerated particles of tantalum can be reduced if the mode diameter of the melt-reduced secondary particles of tantalum is at least 0.7 μm or if their median diameter is at least 1 micron. The particle size of the obtained agglomerated particles of tantalum can easily be reduced if their mode diameter is not more than 1.3 μm or if their median diameter is not more than 3 μm.

It should be noted that the particle size of the primary particles of tantalum can be adjusted, for example, by varying the amount of the molten salt and reaction temperature used to obtain the melt-reduced secondary particles of tantalum. The larger the amount of the molten salt and the lower the reaction temperature, the smaller the particle size of the obtained primary particles of tantalum.

The vapor phase reaction apparatus 40 illustrated in FIG. 2 is an example of the equipment used to obtain vapor phase-reduced secondary particles of tantalum.

This vapor phase reaction apparatus 40 comprises a reactor 41; a tantalum chloride supply conduit 42, a sodium supply conduit 43, and an inert gas supply conduit 44 provided at the upper end 41a of the reactor 41; a withdrawal conduit 45 connected to the lower end of the reactor 41, a heater 46 used for heating the entire reactor 41; and an exhaust gas conduit 47 used to discharge exhaust gas from inside the bottom portion of the reactor 41 outside the heater 46.

The reactor 41 is a funnel-shaped vessel with a cylindrical body 41c and a tapered portion 41d located underneath the cylindrical body 41c. The thus-configured reactor 41 is designed such that the vapor phase-reduced secondary particles of tantalum produced in the cylindrical body 41c accumulate in the tapered portion 41d.

The tantalum chloride supply conduit 42, sodium supply conduit 43, and inert gas supply conduit 44 form a round concentric triple tube in which the tantalum chloride supply conduit 42 is disposed on the innermost side, the inert gas supply conduit 44 is disposed on the outside of the tantalum chloride supply conduit 42, and the sodium supply conduit 43 is disposed on the outermost side. As a result of such an arrangement, rapid and violent reactions between tantalum chloride and sodium are minimized by supplying an inert gas between tantalum chloride and sodium.

In the process for manufacturing vapor phase-reduced secondary particles of tantalum using the above-described vapor phase reaction apparatus 40, tantalum chloride (boiling point: 242° C.) is vaporized by heating and this vaporized tantalum chloride is then supplied to the reactor 41 through the tantalum chloride supply conduit 42. In addition, sodium (boiling point: 883° C.) is vaporized by heating and this vaporized sodium is then supplied to the reactor 41 through the sodium supply conduit 43. In addition, an inert gas such as argon etc. is supplied to the reactor 41 through the inert gas supply conduit 44.

Although at such time the weight ratio of tantalum chloride to sodium (tantalum chloride/sodium) is set to a value equivalent to the stoichiometric ratio (3.1:1), it is preferable to use a slightly higher amount of sodium.

In addition, the tantalum chloride supplied through the tantalum chloride supply conduit 42 may be diluted with an inert gas and the sodium supplied through the sodium supply conduit 43 may also be diluted with an inert gas. The diluent inert gas may be the same, or different from, the inert gas supplied through the inert gas supply conduit 44.

Next, the tantalum chloride and sodium supplied to the reactor 41, while still in a vaporized state, are reacted at, for example, 700-900° C., inside the cylindrical body 41c of the reactor 41 heated by the heater 46.

At first, this reaction forms primary particles of tantalum. These multiple primary particles of tantalum are then encased in the sodium chloride produced by the reaction between tantalum chloride and sodium, thereby forming vapor phase-reduced secondary particles of tantalum.

The formed vapor phase-reduced secondary particles of tantalum drop into and accumulate in the tapered portion 41d of the reactor 41, from which they are removed through the withdrawal conduit 45. In addition, unreacted tantalum chloride, unreacted sodium, and inert gases are discharged from the reactor 41 through the exhaust gas conduit 47.

The vapor phase-reduced secondary particles of tantalum normally have a bulk density of 0.5-1.2 g/cm$^3$ and a BET specific surface area of 6-18 m$^2$/g.

In terms of the particle size of the vapor phase-reduced secondary particles of tantalum obtained after pulverizing, it is preferable to use a mode diameter (maximum frequency diameter) of 0.5-1.3 μm and a median diameter of 0.4-1.2 μm.

The physical particulate characteristics (particle size, bulk density, and specific surface area) of the vapor phase-reduced secondary particles of tantalum can be adjusted by changing the flow rate of tantalum chloride, the flow rate of sodium, the flow rate of the inert gas, and the temperature of the reactor, etc., in the above-described manufacturing process. For example, the specific surface area can be adjusted and reduced by increasing the flow rate of tantalum chloride and the flow rate of sodium.

Granulating Apparatus: The "granulating apparatus" used in Step (a1) and Step (a2) is an apparatus equipped with one or more low-speed impellers and one or more high-speed impellers rotating at a rotational speed that is at least 10 times higher than that of the low-speed impellers. From a practical point of view, the rotational speed of the high-speed impellers is preferably at least 30 times higher, and even more preferably at least 100 times higher, than the rotational speed of the low-speed impellers. In addition, it is preferably not more than 1000 times higher than the rotational speed of the low-speed impellers. Specifically, it is set to approximately 6000 RPM.

For example, a Spartan Granulator from Fuji Paudal Co., Ltd., such as the one illustrated in FIG. 3, which is equipped with a cylindrical vessel 11, a low-speed impeller 12 that rotates along the interior peripheral walls of the vessel 11, a high-speed impeller 13 that rotates at a rotational speed higher than that of the low-speed impeller 12 at the center of the vessel 11, and a sprayer 14 that sprays water inside the vessel 11, is suggested as the granulating apparatus.

In addition, a "High Flex Gral" from Fukae Powtec Co., Ltd., such as the one illustrated in FIG. 4, which is equipped with a cylindrical vessel 21; a low-speed impeller 22 installed adjacent the bottom surface of the vessel 21 and equipped with multiple rotary blades 22b attached to a rotary shaft 22a arranged in the vertical direction; a high-speed impeller 23 installed above the low-speed impeller 22 and equipped with multiple stirrer blades 23b attached to a rotary shaft 23a arranged in the diametrical direction of the vessel 21; and a sprayer 24 spraying water inside the vessel 21 is suggested as the granulating apparatus. It should be noted that the high-speed impeller 23 is adapted to rotate at a rotational speed that is higher than that of the low-speed impeller 22.

Furthermore, a "Loedige Mixer" from Matsubo Corporation, such as the one illustrated in FIG. 5, which comprises: a cylindrical vessel 51; a low-speed impeller 52 rotating along the interior peripheral walls about the central axis of the vessel 51 as a center of rotation; a high-speed impeller 53 installed on the peripheral wall of the vessel 51 facing the central axis of the vessel 51; and a sprayer 54 spraying water inside the vessel 51 is suggested as the granulating apparatus. It should be noted that the high-speed impeller 53 is adapted to rotate at a rotational speed that is higher than that of the low-speed impeller 52.

Pre-mixing Step: When a Spartan Granulator from Fuji Paudal Co., Ltd. is used as the granulating apparatus, the rotational speed of the low-speed impeller 12 in the pre-mixing step is preferably 13-27 RPM. If the rotational speed of the low-speed impeller 12 is 13 RPM or higher, it will be sufficient for supplying the granulated powder (secondary particles of tantalum) to the high-speed impeller while stirring it, and if the speed is not higher than 27 RPM no unwanted scattering of the granulated powder occurs.

The rotational speed of the high-speed impeller 13 is preferably 750-6200 RPM. If the rotational speed of the high-speed impeller 13 is 750 RPM or higher, the secondary particles of tantalum can be pulverized to a sufficient degree. However, there is no advantage to increasing the rotational speed beyond 6200 RPM because this does not change the degree of pulverization.

When a "High Flex Gral" from Fukae Powtec Co., Ltd. is used as the granulating apparatus, the rotational speed of the low-speed impeller 22 in the pre-mixing step is preferably 100-300 RPM. If the rotational speed of the low-speed impeller 22 is 100 RPM or higher, it will be sufficient for supplying the granulated powder to the high-speed impeller while stirring it, and if the speed is not higher than 300 RPM no unwanted scattering of the granulated powder occurs.

The rotational speed of the high-speed impeller 23 is preferably 1500-6000 RPM. If the rotational speed of the high-speed impeller 23 is 1500 RPM or higher, the secondary particles of tantalum can be pulverized to a sufficient degree. However, there is no advantage to increasing the rotational speed beyond 6000 RPM because this does not change the degree of pulverization.

When a "Loedige Mixer" from Matsubo Corporation is used as the granulating apparatus, the rotational speed of the low-speed impeller 52 in the pre-mixing step is preferably 36-300 RPM. If the rotational speed of the low-speed impeller 52 is 36 RPM or higher, it will be sufficient for supplying the granulated powder to the high-speed impeller while stirring it, and if the speed is not higher than 300 RPM no unwanted scattering of the granulated powder occurs.

The rotational speed of the high-speed impeller 53 is preferably 3000-6000 RPM. If the rotational speed of the high-speed impeller 53 is 3000 RPM or higher, the secondary particles of tantalum can be pulverized to a sufficient degree. However, there is no advantage to increasing the rotational speed beyond 6000 RPM because this does not change the degree of pulverization.

The duration of pre-mixing is preferably 2-10 minutes. If the pre-mixing time is 2 minutes or more, the particles can be homogenized to a sufficient degree. However, there is no advantage to mixing for more than 10 minutes because this is unlikely to produce any mixing time-dependent effects.

Step (a1): In Step (a1), the added water serves as a binder and causes the secondary particles of tantalum to stick together, while some of the water impregnates the secondary particles of tantalum. The bonding of the particles in this stage is weak and is easily undone by drying. If the high-speed impeller is not used for stirring in this stage, partial agglomeration may proceed to produce coarse particles.

When a "Spartan Granulator" from Fuji Paudal Co., Ltd. is used as the granulating apparatus, the rotational speed of the low-speed impeller 12 in Step (a1) is preferably 13-27 RPM. If the rotational speed of the low-speed impeller 12 is 13 RPM or higher, the secondary particles of tantalum in the vessel 11 can be homogenized to a sufficient degree, and if it is not more than 27 RPM, excessive crushing can be minimized.

In addition, the rotational speed of the high-speed impeller 13 is preferably 3000-6000 RPM. If the rotational speed of the high-speed impeller 13 is 3000 RPM or higher, the secondary particles of tantalum in the vessel 11 can be homogenized to a sufficient degree, and if it is not more than 6000 RPM, excessive crushing can be minimized.

When a "High Flex Gral" from Fukae Powtec Co., Ltd. is used as the granulating apparatus, the rotational speed of the low-speed impeller 22 in Step (a1) is preferably 100-300 RPM. If the rotational speed of the low-speed impeller 22 is 100 RPM or higher, the secondary particles of tantalum in the vessel 21 can be homogenized to a sufficient degree, and if it is not more than 300 RPM, excessive crushing can be minimized.

In addition, the rotational speed of the high-speed impeller 23 is preferably 1500-6000 RPM. If the rotational speed of the high-speed impeller 23 in Step (a1) is 1500 RPM or higher, the secondary particles of tantalum in the vessel 21 can be homogenized to a sufficient degree, and if it is not more than 6000 RPM, excessive crushing can be minimized.

When the Loedige Mixer from Matsubo Corporation is used as the granulating apparatus, the rotational speed of the low-speed impeller 52 in Step (a1) is preferably 36-300

RPM. If the rotational speed of the low-speed impeller 52 is 36 RPM or higher, the secondary particles of tantalum in the vessel 21 can be homogenized to a sufficient degree, and if it is not more than 300 RPM, excessive crushing can be minimized.

In addition, the rotational speed of the high-speed impeller 23 is preferably 3000-6000 RPM (rpm). If the rotational speed of the high-speed impeller 23 in Step (a1) is 3000 RPM or higher, the secondary particles of tantalum in the vessel 21 can be homogenized to a sufficient degree, and if it is not more than 6000 RPM, excessive crushing can be minimized.

The rate of water addition in Step (a1) is preferably constant because this makes it easy to achieve the target particle size distribution. In addition, the rate of water addition is selected as appropriate depending on the amount of the secondary particles of tantalum inside the vessel and the dimensions etc. of the target granulated powder. Normally, as the rate of addition is changed to increase the amount of water per unit weight of the secondary particles of tantalum, the particle size tends to become larger.

The amount of added water is preferably 10-20 parts by weight per 100 parts by weight of the secondary particles of tantalum. Agglomerated particles of tantalum with an appropriate particle size distribution can be readily obtained if the amount of added water is at least 10 parts by weight and not more than 20 parts by weight. It should be noted that the mean particle size tends to become larger as the amount of added water increases.

The amount of added water has to be adjusted depending on the bulk density of the secondary particles of tantalum. For example, when the mean particle size is set to 30-40 μm, it is preferable to adjust the amount of added water as shown below. When using secondary particles of tantalum with a bulk density of 0.47 g/cm$^3$, it is preferable to set the amount of added water to 18-19 parts by weight. When using secondary particles of tantalum with a bulk density of 0.71 g/cm$^3$, it is preferable to set the amount of added water to 16.5-17.5 parts by weight. When using secondary particles of tantalum with a bulk density of 0.92 g/cm$^3$, it is preferable to set the amount of added water to 14.5-15.5 parts by weight.

Since the tendency towards increased mean particle size becomes more pronounced as the bulk density grows and the amount of added water increases, it is difficult to adjust the particle size. For example, when secondary particles of tantalum with a bulk density of 0.47 g/cm$^3$ are used, a rapid coarsening of the particles takes place when the amount of added water is 20 parts by weight. When secondary particles of tantalum with a bulk density of 0.71 g/cm$^3$ are used, a rapid coarsening of the particles occurs when the amount of added water is 18 parts by weight. When secondary particles of tantalum with a bulk density of 0.92 g/cm$^3$ are used, a rapid coarsening of the particles occurs when the amount of added water is 16 parts by weight. For this reason, controlling particle size is difficult.

It is preferable to add phosphorus to the water added in Step (a1) because this allows for thermal agglomeration to be accomplished while maintaining a high surface area in the subsequent Step (a4). Phosphoric acid, ammonium hexafluorophosphate, and the like are suggested as the forms of phosphorus added at this point.

If the amount of the secondary particles of tantalum used is 100 wt %, then the amount of the added phosphorus, in terms of phosphorus atoms, is preferably 0.01-0.03 wt % (100-300 ppm).

The duration of Step (a1) is preferably 1-6 minutes. If the duration of Step (a1) is 1 minute or longer, the secondary particles of tantalum can be granulated to a sufficient degree. However, there is no advantage to extending it beyond 6 minutes because this is unlikely to produce any stirring time-dependent granulation effects.

Step (a2): In Step (a2), the operation of stirring is performed using the low-speed impeller and the high-speed impeller without adding water. In this step, the water contained in the hydrated powder (hydrated aggregates) obtained in Step (a1) rises to the surface and serves as a binder, thereby further increasing the bond between the secondary particles of tantalum.

If the high-speed impeller is not used at this time, the powder is likely to separate into coarse particles exhibiting strong water-induced binder effects and minute particles with insufficient binder effects, thereby broadening the particle size distribution. Furthermore, when the high-speed impeller is used, granulation may fail even with the appropriate amount of water. If the high-speed impeller is used mid-way through the process, after impregnation with a large amount of water without operating the high-speed impeller, then granulation proceeds rapidly and massive particles are agglomerated.

The duration of Step (a2) is preferably 5-30 minutes, and even more preferably, 5-15 minutes. If the duration of Step (a2) is 5 minutes or longer, the particles can be granulated to a sufficient degree. However, not only is stirring for more than 30 minutes disadvantageous because of the absence of any duration-dependent effects beyond that point, but the powder is likely to separate into particles exhibiting advanced agglomeration and particles that get crushed, which tends to broaden the particle size distribution.

The rotational speeds of the low-speed impeller 12 and high-speed impeller 13 used when the Spartan Granulator from Fuji Paudal Co., Ltd. is employed as the granulating apparatus in Step (a2) are similar to those of Step (a1). In addition, the rotational speed of the low-speed impeller 22 and the rotational speed of the high-speed impeller 23 used when the "High Flex Gral" from Fukae Powtec Co., Ltd. is employed as the granulating apparatus are similar to those of Step (a1).

While it is possible to repeat Step (a1) and Step (a2) if necessary, it is preferable to perform each step just once.

Step (a3): The heat drying process, vacuum drying process, vacuum heat drying process, steam drying process, etc., can be utilized as the method for drying granulated powder in Step (a3). The heating temperature used in the steam drying process is preferably 110-150° C. If the drying temperature is 110° C., the particles can be dried to a sufficient degree within a short period of time. However, if it exceeds 150° C., unnecessary heating will cause a waste of energy.

If coarse particles with a particle size of 250 μm or more are formed by drying, these coarse particles may be pulverized and particles with a bulk density of 0.2-1.0 g/cm$^3$ may be separated out by screening and recycled by mixing them with the secondary particles of tantalum used in Step (a1).

In addition, recycling prior to Step (a3) (drying) may be accomplished by introducing particles screened out in the pre-mixing step (before adding the water), thereby causing the moisture that agglomerates the secondary particles to disperse in other moisture-free particles and causing them to de-agglomerate.

Step (a4): In Step (a4), the dry aggregates obtained in Step (a3) are heated and sintered.

The sintering temperature is preferably 800-1250° C. If the sintering temperature is 800° C., sintering to a sufficient degree can be accomplished within a short period of time. However, if the sintering temperature exceeds 1250° C., unnecessary heating results in undesirable coarsening of the primary particles as well as a waste of energy.

The duration of sintering is preferably 10 minutes to 2 hours. If the sintering time is 10 minutes or longer, the aggregates can be sintered to a sufficient degree. When the sintering time is 2 hours, the sintering process is practically complete and there is no advantage to spending any more time.

Deoxidation Step: Since the agglomerated particles of tantalum are required to be oxygen-free, in the above-described manufacturing process it is preferable to perform deoxidation treatment in a suitable manner. A method in which a reducing agent such as magnesium is added and the particles are heated at a temperature above the melting point and below the boiling point of the reducing agent in an inert gas atmosphere such as argon or in a vacuum is suggested as an exemplary method of deoxidation treatment.

Although the deoxidation treatment may be conducted only once, it is preferable to repeat it multiple times, and performing it twice is even more preferable.

The deoxidation treatment may be conducted after mixing with agglomerated tantalum particles (Y), together with agglomerated tantalum particles (Y).

Process (b) for Manufacturing Agglomerated Tantalum Particles (Y): The manufacturing process (b) used to obtain agglomerated tantalum particles (Y) comprises the steps of: obtaining hydrated aggregates by adding water to secondary particles of tantalum and stirring the mixture in a granulating apparatus (hereinafter referred to as "Step (b1)"), and, after that, obtaining dry aggregates by drying the hydrated aggregates (hereinafter referred to as "Step (b2)"); spheronizing the dry aggregates by passing them through screens (hereinafter referred to as "Step (b3)"); and sintering the spheronized dry aggregates (hereinafter referred to as "Step (b4)").

In addition, a deoxidation step is preferably provided after Step (b4) in the manufacturing process (b).

Step (b1): In the same manner as the secondary particles of tantalum used in Step (a1), the secondary particles of tantalum used in Step (b1) are preferably melt-reduced secondary particles of tantalum and vapor phase-reduced secondary particles of tantalum. Melt-reduced secondary particles of tantalum are particularly preferable because they facilitate granulation.

The granulating apparatuses used in Step (b1) are the same as those described in connection with the manufacturing process (a).

In Step (b1), water is added before, during, or after stirring. The added water acts as a binder. The bulk density of the obtained agglomerated particles of tantalum can be adjusted by changing the amount of water added at such time. The preferred amount of added water that is capable of lowering bulk density varies depending on the type of the secondary particles of tantalum and the granulating apparatus used.

The addition of phosphorus and boron, etc., to the added water is preferable, and the addition of phosphorus is especially preferable for the same reasons as those described in Step (a1). The forms of phosphorus and the amount of the added phosphorus or boron are the same as those described in Step (a1).

A method involving addition of water while stirring the material using the above-described granulating apparatus, a method involving removal of excess supernatant after causing the material to sink in water before or after stirring, a method involving admixing water before or after stirring, or a method that combines them, etc., is suggested as the method of water addition.

Among the above, the addition of water while stirring in the above-described granulating apparatus is preferred. As a result of stirring, partial agglomeration caused by the added water can be avoided and the agglomerates can be homogenized. In addition, the treatment time can be reduced.

In other words, Step (b1) preferably includes a step of stirring in a granulating apparatus while adding water. In such a case, in order to pre-homogenize the secondary particles of tantalum, a step of pre-mixing the secondary particles of tantalum is preferably provided before the step of stirring in a granulating apparatus while adding water. In addition, a step involving further stirring the hydrated aggregates without adding water may be performed after the step of stirring in a granulating apparatus while adding water.

When Step (b1) includes the step of stirring in a granulating apparatus while adding water, this step coincides with Step (a1) (the step of obtaining hydrated aggregates by stirring in the granulating apparatus while adding water) of the manufacturing process (a) used to obtain agglomerated tantalum particles (X). For this reason, they can be performed simultaneously.

In addition, when Step (b1) includes the step of pre-mixing, this step can be performed simultaneously with the pre-mixing step in the above-mentioned Step (a1).

In addition, when Step (b1) includes the step of stirring the hydrated aggregates without adding water, this step can be performed simultaneously with the above-mentioned Step (a2).

When Step (b1) includes a step of pre-mixing followed by a step of stirring in a granulating apparatus while adding water and a step of further stirring without adding water, it is possible to perform the pre-mixing step used to obtain agglomerated tantalum particles (X), Step (a1), and Step (a2), and then allocate a portion of the hydrated aggregates obtained after Step (a2) as aggregates used for manufacturing agglomerated tantalum particles (Y) and supply them for use in Step (b2).

When a granulating apparatus is used, one to several dozen hydrated aggregates are formed by the addition of water. While their specific number varies depending on the amount of the pulverized secondary particles of tantalum used, almost all of the pulverized material is turned into hydrated aggregates. The pulverized material adhering to the walls etc. of the apparatus without forming hydrated aggregates can be recovered and recycled by mixing it "as is" with the pulverized material.

The resultant hydrated aggregates are coarse particles with a particle size of 2-10 cm. In the case of particles with a particle size of less than 2 cm, it is difficult to obtain the target agglomerated particles of tantalum, and it is substantially impossible to obtain coarse particles with a particle size exceeding 10 cm.

Step (b2): In Step (b2), dry aggregates are obtained by drying the hydrated aggregates. In Step (b2), it is preferable to set the moisture content of the dry aggregates to not more than 1.0 wt % because this facilitates the production of the target agglomerated particles of tantalum. In addition, setting it to 0.3 wt % or more is preferable in terms of reducing the drying time. In addition, adjusting it to a moisture content of 0.5-1.5 mg/m² is preferable in terms of moisture content per unit surface area.

The heat drying process, vacuum drying process, vacuum heat drying process, and the like can be utilized as the drying methods. Among these, the vacuum drying process and vacuum heat drying process are preferred because they permit sufficient drying.

The drying temperature used for drying is preferably 80-120° C. If the drying temperature is 80° C. or higher, the particles can be dried to a sufficient degree within a short period of time, and if the drying temperature is 120° C. or lower, the obtained dry aggregates can be readily de-agglomerated.

Step (b3): In Step (b3), spheronized particles are obtained by passing the dry aggregates obtained in the drying step through screens and de-agglomerating them. A batch-type screen is used. Normally, the screen is vibrated in the horizontal or vertical direction and moved in a circular manner, thereby causing the dry aggregates to fall through.

For example, a mesh or a sheet of perforated metal, etc., can be used as a screen. A single-stage screen or stacked multiple-stage screens may be used.

Passage-assisting balls are preferably deposited on top of the screen. When deposited on top of the screen, the passage-assisting balls bounce on the screen, which makes it possible to increase the vibration of the screen and thus reduce the time it takes the dry aggregates to pass through the screen.

A screen with an opening surface area selected in accordance with the target particle size distribution is used in Step (b3). The volume-mean particle size of agglomerated particles of tantalum intended for use in capacitors is preferably 20-100 μm. When the volume-mean particle size of all the agglomerated particles of tantalum is set to 100 μm or less, it is preferable to use a mesh with openings of not more than 75 μm. In addition, when the volume-mean particle size of all the agglomerated particles of tantalum is set to 20 μm or more, it is preferable to use a mesh with openings of at least 33 μm.

If there remain any dry aggregates that have not been de-agglomerated in Step (b3), they can be recycled as secondary tantalum particles for use in Step (b1).

In addition, when the screens used in Step (b3) are configured in a multi-stage manner, the screen passage time of the dry aggregates varies depending on the opening surface area of the selected screens.

Therefore, the screen passage time of the dry aggregates can be reduced by appropriately combining the screens that are used. For example, a combination of 60 mesh, 100 mesh, 160 mesh, and 200 mesh, etc., can be employed as a screen combination capable of reducing the screen passage time of the dry aggregates.

Prior to heat treating the spheronized particles, it is preferable to vibrate or roll the screened powder on a plate because this allows for more spheronized particles to be obtained in Step (b3).

A method in which the powder is vibrated on a plate in the horizontal or vertical direction is suggested as the method for vibrating the screened powder on a plate.

A method in which the plate is rotated about its center of gravity and a method in which the plate is moved in a circular manner are suggested as the methods for rolling the screened powder on a plate. Although the plate may be disposed either horizontally or at a slant with respect to the horizontal direction when the flat plate is rotated, the horizontal arrangement is preferable because it makes it possible to reduce the crushing of the screened powder as a result of mutual contact.

Although the plate used at such time may be, for example, a flat plate, a spherically concave plate, or a curved plate, etc., a flat plate is preferred because it makes it possible to reduce the crushing of the screened powder as a result of mutual contact. A side plate may be installed in order to prevent the screened powder from spilling over the edges of the plate while being vibrated or rolled.

In addition, the bottom surface of the receptacle used to hold the screened powder may be utilized as such a plate. When the bottom surface of the receptacle is utilized, the powder screened using the vibration and circular motion of the screen can be spheronized on the bottom surface of the receptacle while simultaneously passing the dry aggregates through the screen and de-agglomerating them.

In Step (b3), the screened powder is unlikely to be pulverized and the as-screened particle size can be maintained practically intact. No excessive formation of fines with a particle size of less than 10 μm takes place. This is believed to be due to the absence of strong shearing forces applied during vibration and rolling to the screened powder as occurs during stirring. Furthermore, no bonding between the particles of the screened powder is likely to occur either. This is believed to be due to the absence of collisions involving powerful impact forces between the particles of the screened powder during vibration and rolling and, moreover, due to the dry state of the screened powder. Thus, in the spheronization step, the screened powder undergoes deformation that eliminates corners without significantly changing the particle size, thereby allowing for spheronized particles of a uniform particle size to be formed in accordance with the opening surface area of the screen.

The above-described operations of screening and vibration/rolling on a plate may each be performed either multiple times in an alternating manner or only once.

When the operations of screening and vibration or rolling on a plate are performed multiple times in an alternating manner, a method is employed in which, for example, in each de-agglomeration step, dry aggregates or powder that has been passed through a previous screen are passed through screens placed on top of a receptacle and the powder that passes through the screen on the receptacle is rolled or vibrated in the receptacle. If a single-stage screen is utilized in each de-agglomeration step, from the standpoint of efficient particle size reduction it is preferable to use the largest possible opening surface area for the screen used in the first de-agglomeration step and then successively reduce the opening surface area of the screens utilized in the second and subsequent de-agglomeration steps.

When the operations of screening and vibration or rolling on a plate are performed only once, a method is employed in which, for example, dry aggregates are passed through screens placed on top of a receptacle in a multi-stage configuration and the powder that passes through the screens on the receptacle is rolled or vibrated in the receptacle. When a multi-stage screen is used, from the standpoint of efficient particle size reduction it is preferable to dispose the screens such that the opening surface area becomes progressively smaller in each lower stage.

Step (b4): In Step (b4), the spheronized particles obtained in Step (b3) are heated and sintered.

The sintering temperature is preferably 800-1250° C. If the sintering temperature is 800° C. or higher, sintering to a sufficient degree can be accomplished within a short period of time. However, if the sintering temperature exceeds 1250° C., unnecessary heating leads to coarsening as well as a waste of energy.

The duration of sintering is preferably 10 minutes to 2 hours. If the sintering time is 10 minutes or longer, the aggregates can be sintered to a sufficient degree. When the heat treatment time is 2 hours, the sintering process is practically complete and there is no advantage to spending any more time.

Deoxidation Step: Since the agglomerated particles of tantalum are required to be oxygen-free, in the manufacturing process (b), it is preferable to perform deoxidation treatment in a suitable manner. The method of the deoxidation treatment, as well as the preferred rotational speeds, is the same as that described in the manufacturing process (a). The deoxidation treatment may be conducted after mixing with agglomerated tantalum particles (X), together with agglomerated tantalum particles (X).

Process (c) for Manufacturing Agglomerated Tantalum Particles (Y): The manufacturing process (c) used to obtain agglomerated tantalum particles (Y) includes the steps of: obtaining hydrated aggregates by adding water to secondary particles of tantalum and pulverizing the mixture in a pulverizer (hereinafter referred to as "Step (c1)"), and, after that, obtaining dry aggregates by drying the hydrated aggregates (hereinafter referred to as "Step (c2)"); spheronizing the dry aggregates by passing them through screens (hereinafter referred to as "Step (c3)"); and sintering the spheronized dry aggregates (hereinafter referred to as "Step (c4)").

In addition, a deoxidation step is preferably provided after Step (c4) in the manufacturing process (c).

In the same manner as the secondary particles of tantalum used in Step (a1), the secondary particles of tantalum used in Step (c1) are preferably melt-reduced secondary particles of tantalum and vapor phase-reduced secondary particles of tantalum. Melt-reduced secondary particles of tantalum are particularly preferable because they facilitate granulation.

The pulverizing apparatus used in Step (c1) is any apparatus possessing pulverizing capability, with the exception of the aforementioned granulating apparatus. Ball mills, chopper mills, speed mills, jaw crushers, cutter mills, screen mills, jet mills, etc., are suggested as examples of pulverizing machines.

In Step (c1), water is added before, during, or after pulverizing. The added water acts as a binder. The bulk density of the obtained agglomerated particles of tantalum can be adjusted by changing the amount of water added at such time. The preferred amount of added water that is capable of lowering bulk density varies depending on the type of the secondary particles of tantalum and the granulating apparatus used.

The addition of phosphorus and boron, etc., to the added water is preferable, and the addition of phosphorus is especially preferable for the same reasons as those described in Step (a1). The forms of phosphorus and the amount of the added phosphorus or boron are the same as those described in Step (a1).

A method involving addition of water while pulverizing the material using the above-described pulverizing apparatus, a method involving removal of excess supernatant after causing the material to sink in water before or after pulverizing, a method involving admixing water before or after pulverizing, or a method that combines them, etc., is suggested as the method of water addition.

In Step (c2), dry aggregates are obtained by drying the hydrated aggregates. Step (c2) is the same as Step (b2) in the manufacturing process (b).

In Step (b3), spheronized particles are obtained by passing the dry aggregates obtained in the drying step through screens and de-agglomerating them. Step (c3) is the same as Step (b3) in the manufacturing process (b).

If dry aggregates that have not been de-agglomerated remain in Step (c3), they can be recycled as secondary tantalum particles for use in Step (c1).

In Step (c4), the spheronized particles obtained in Step (c3) are heated and sintered. Step (c4) is the same as Step (b4) in the manufacturing process (b).

In the manufacturing process (c), it is also preferable to perform deoxidation treatment in a suitable manner. The method of the deoxidation treatment, as well as the preferred rotational speeds, is the same as that described in the manufacturing process (a). The deoxidation treatment may be conducted after mixing with agglomerated tantalum particles (X), together with agglomerated tantalum particles (X).

Process (d) for Manufacturing Agglomerated Tantalum Particles (Y): The manufacturing process (d) used to obtain agglomerated tantalum particles (Y) includes the steps of: obtaining hydrated aggregates by adding water to secondary particles of tantalum (hereinafter referred to as "Step (d1)"), and, after that, obtaining dry aggregates by drying the hydrated aggregates (hereinafter referred to as "Step (d2)"); obtaining sintered aggregates by sintering the dry aggregates (hereinafter referred to as "Step (d3)"); and micronizing the sintered aggregates (hereinafter referred to as "Step (d4)").

In addition, a deoxidation step is preferably provided after Step (d4) in the manufacturing process (d).

In the same manner as the secondary particles of tantalum used in Step (a1), the secondary particles of tantalum used in Step (d1) are preferably melt-reduced secondary particles of tantalum and vapor phase-reduced secondary particles of tantalum. Melt-reduced secondary particles of tantalum are particularly preferable because they facilitate granulation and make it easy to obtain particles that are sufficiently strong for use in the present invention.

The addition of phosphorus and boron, etc., to the added water is preferable, and the addition of phosphorus is especially preferable for the same reasons as those described in Step (a1). The forms of phosphorus and the amount of the added phosphorus or boron are the same as those described in Step (a1).

A method involving removal of excess supernatant after causing the secondary particles of tantalum to sink in water, a method involving mixing water with the secondary particles of tantalum, etc., are suggested as the methods of water addition.

In Step (d2), dry aggregates are obtained by drying the hydrated aggregates. Step (d2) is the same as Step (b2) in the manufacturing process (b).

In Step (d3), sintered aggregates are obtained by heating and sintering the dry aggregates obtained in Step (d2).

Step (d3) is the same as Step (b4) in the manufacturing process (b).

In Step (d4) the sintered aggregates are micronized. The method set forth in Japanese Laid-Open Patent Application Pub. No. 2006-336042 is preferably used as the method of micronization. Namely, it is preferable to de-agglomerate the sintered aggregates using a de-agglomerating machine equipped with differential rolls. The "differential rolls" are made up of 2 rolls having surface irregularities formed thereon at the same frequency, with these 2 rolls arranged in a spaced-apart configuration such that the respective surface irregularities are in a mutually opposed relationship. These 2 rolls are contra-rotated relative to each other and, in addition, rotated at respectively different rotational speeds.

In this case, it is preferable to pre-pulverize the agglomerated powder prior to de-agglomeration. Chopper mills, speed mills, jaw crushers, cutter mills, screen mills, and other pulverizing machines for coarse pulverizing can be used for pre-pulverizing.

A method in which pulverization is performed using a pulverizing machine such as a chopper mill, as described in Japanese Laid-Open Patent Application Pub. No. Hei 4-362101, can be utilized as the method of micronization.

After micronization, it is preferable to perform separation by screening and recover powder in predetermined particle size ranges.

In the manufacturing process (d), it is also preferable to perform deoxidation treatment in a suitable manner.

The method of the deoxidation treatment, as well as the preferred rotational speeds are the same as those described in the manufacturing process (a). The deoxidation treatment may be conducted after mixing with agglomerated tantalum particles (X), together with agglomerated tantalum particles (X).

Mixing Step: In the mixing step, the agglomerated particles of tantalum (Y) obtained in the manufacturing process (a) are mixed with the agglomerated particles of tantalum (X) obtained in any of the manufacturing processes (b)-(d). It is preferable to perform the mixing operation using a non-impact mixer, for example, a V-type blender, a conical blender, etc.

The porosity distribution and the amount of micro-particles present in the pellets can be adjusted by changing the mixing ratio in a suitable manner.

Characteristics of Agglomerated Tantalum Particles (X): Agglomerated tantalum particles (X) are characterized by the fact that they have high particle strength, contain essentially no micro-particles, and are not likely to produce micro-particles even if subjected to impact. The tendency to generate micro-particles upon impact can be estimated by the proportion of micro-particles obtained after ultrasonication.

Specifically, it is estimated by the cumulative fraction (%) of particles of 3 μm or less obtained after a 10-minute irradiation with 25-Watt ultrasound. The cumulative fraction (%) of particles of 3 μm or less was chosen because a correlation was found between particle strength estimated based on the cumulative fraction (%) of particles of 3 μm or less and the amount of pores with a pore size of approximately 1 micron in pellets made from the particles. In addition, the duration of ultrasonication was set to 10 minutes because the 10-minute treatment produced a sharp difference from agglomerated tantalum particles (Y).

In agglomerated tantalum particles (X), the cumulative fraction (%) of particles with a particle size of 3 μm or less after a 10-minute irradiation with 25-Watt ultrasound is 5 wt % or less. More preferably, this cumulative fraction of particles with a particle size of 3 μm is 1-4 wt %. The smaller this cumulative fraction of particles with a particle size of 3 μm, the easier it is to obtain the requisite effects by mixing with agglomerated tantalum particles (Y).

The mode diameter of agglomerated tantalum particles (X) is preferably 5-120 μm, and even more preferably, 20-90 μm. If the mode diameter of agglomerated tantalum particles (X) is 20 μm or more, the flowability of the agglomerated particles is improved and they can be easily charged into the mold. In addition, the problems associated with extracting the male mold from the female mold are also less likely to occur. In addition, a diameter of not more than 90 μm permits molding of small and thin tantalum pellets.

The median diameter of agglomerated tantalum particles (X) is preferably 5-100 μm, and even more preferably, 20-90 μm. If the median diameter of agglomerated tantalum particles (X) is 20 μm or more, the flowability of the agglomerated particles is improved and they can be easily charged into the mold. Additionally, the problems associated with extracting the male mold from the female mold are also less likely to occur. In addition, a diameter of not more than 90 μm permits molding of small and thin tantalum pellets.

In order to adjust the mode diameter and median diameter to the preferred range, it is sufficient to control the amount of water added during Step (a1) and the stirring time of Step (a2).

In addition, the bulk density of agglomerated tantalum particles (X) is preferably 1.2-2.5 $g/cm^3$. If the bulk density of the agglomerated particles of tantalum is 1.2 $g/cm^3$ or higher, sufficient loading can be ensured during tantalum pellet molding. If it is not more than 2.5 $g/cm^3$, a sufficient rate of compression can be ensured during tantalum pellet molding.

In order to adjust the bulk density to the preferred range, it is sufficient to control the amount of water added during Step (a1) and the stirring time of Step (a2).

It should be noted that while agglomerated tantalum particles (X) exhibit strong connectivity inside the secondary particles of tantalum, the binding forces between the secondary particles of tantalum tend to be relatively weak.

Characteristics of Agglomerated Tantalum Particles (Y): Agglomerated tantalum particles (Y) are characterized by the fact that they have relatively low particle strength, contain a certain amount of micro-particles even without impact, and, in addition, are likely to produce micro-particles when subjected to impact. As mentioned above, the tendency to generate micro-particles upon impact can be estimated by the proportion of micro-particles obtained after ultrasonication.

In agglomerated tantalum particles (Y), the cumulative fraction (%) of particles with a particle size of 3 μm or less after a 10-minute irradiation with 25-Watt ultrasound is 10 wt % or more. This cumulative fraction of particles with a particle size of 3 μm is preferably 10-60% and, even more preferably, 10-50%. If this cumulative fraction of particles with a particle size of 3 μm is too small, sufficient effects cannot be obtained by mixing with agglomerated tantalum particles (X). On the other hand, when this cumulative fraction of particles with a particle size of 3 μm is too large, the undesirable effects produced by the fines become more pronounced, just as it was in the case of the inventions set forth in Patent Documents 1-3.

The mode diameter of agglomerated tantalum particles (Y) is preferably 10-150 μm, and even more preferably, 20-100 μm. If the mode diameter of agglomerated tantalum particles (Y) is 20 μm or more, the flowability of the agglomerated particles is improved and they can be easily charged into the mold. In addition, the problems associated with extracting the male mold from the female mold are also less likely to occur. In addition, a diameter of not more than 100 μm permits molding of small and thin tantalum pellets.

In addition, the median diameter of agglomerated tantalum particles (Y) is preferably 10-120 μm, and even more preferably, 20-100 μm. If the median diameter of agglomerated tantalum particles (Y) is 20 μm or more, the flowability of the agglomerated particles is improved and they can be easily charged into the mold. In addition, the problems associated with extracting the male mold from the female mold are also less likely to occur. In addition, a diameter of not more than 100 μm permits molding of small and thin tantalum pellets.

In order to adjust the mode diameter and median diameter to the preferred range, it is sufficient to control the amount of water added during Steps (b1), (c1), and (d1) and the opening surface area of the screens used in Steps (b3) and (c3).

In addition, the bulk density of agglomerated tantalum particles (Y) is preferably 1.2-2.5 g/cm$^3$. If the bulk density of the agglomerated particles of tantalum is 1.2 g/cm$^3$ or higher, sufficient loading can be ensured during tantalum pellet molding. If it is not more than 2.5 g/cm$^3$, a sufficient rate of compression can be ensured during tantalum pellet molding.

In order to adjust the bulk density to the preferred range, it is sufficient to control the amount of water added during Steps (b1), (c1), and (d1) and the opening surface area of the screens used in Steps (b3) and (c3).

Characteristics of Mixed Tantalum Powder: The mixed tantalum powder of this embodiment is made up of a mixture of agglomerated tantalum particles (X) and agglomerated tantalum particles (Y). Therefore, it has the characteristics of both types of particles depending on the mixing ratio of agglomerated tantalum particles (X) and agglomerated tantalum particles (Y).

From the standpoint of eliminating the disadvantages of using the respective agglomerated particles independently, the mixing ratio (weight ratio) of agglomerated tantalum particles (X) and agglomerated tantalum particles (Y) is preferably adjusted to a range of 10:90-90:10 and, even more preferably, to a range of 25:75-75:25.

The specific mixing ratio of agglomerated tantalum particles (X) and agglomerated tantalum particles (Y) is determined in a suitable manner depending on the particle strength of agglomerated tantalum particles (Y), the powder properties of agglomerated tantalum particles (X), agglomerated tantalum particles (Y), and the mixed powder, and the preferred characteristics, etc., of the pellets produced from the mixed tantalum powder. The lower the particle strength of agglomerated tantalum particles (Y), the lower the mixing ratio of agglomerated tantalum particles (Y) should be.

Tantalum Pellet: The tantalum pellet of this embodiment can be obtained by molding the mixed tantalum powder of this embodiment. In addition, the process for manufacturing tantalum pellets of this embodiment is a process, in which tantalum pellets are obtained by molding a mixed tantalum powder produced in accordance with the above-described process for manufacturing a mixed tantalum powder.

For example, a process, in which a binder such as camphor ($C_{10}H_{16}O$) etc. is added to the mixed tantalum powder as needed in the amount of 3-5 wt % based on 100 wt % of the mixed tantalum powder, and the mixture is charged into a form, compression molded, and sintered by heating for 0.3-1 hours at 1000-1400° C. while still in a compressed state, is suggested as a process for molding tantalum pellets. Such a molding method makes it possible to obtain tantalum pellets consisting of sintered porous bodies.

When a tantalum pellet obtained by the above-described molding method is used as a capacitor anode, before the mixed tantalum powder is compression molded, it is preferable to embed lead wires into the mixed tantalum powder in order to integrate the lead wires into the tantalum pellet.

The tantalum pellet of this embodiment contains agglomerated tantalum particles (X), which have high particle strength and are unlikely to generate micro-particles with a size of several μm. For this reason, in comparison with pellets consisting only of agglomerated tantalum particles (Y), the particles have higher flowability and are easier to charge into the mold during pellet molding. In addition, the problems associated with extracting the male mold from the female mold are also less likely to occur. In addition, due to the fact that the tantalum pellet is produced from the mixed tantalum powder of this embodiment, the tantalum pellet possesses sufficient porosity. As a result, anodes fabricated from the tantalum pellets of this embodiment can be easily impregnated with a solid electrolyte to a sufficient degree and the resistance of such anodes can easily be reduced.

On the other hand, the tantalum pellet of this embodiment contains agglomerated tantalum particles (Y), which have relatively low particle strength and are likely to generate micro-particles with a size of several μm. For this reason, the likelihood of generating excess space that does not contribute to electrostatic capacitance is lower in comparison with tantalum pellets consisting only of agglomerated tantalum particles (X). As a result, the electrostatic capacitance per unit volume of anodes fabricated from the tantalum pellets of this embodiment can be increased. In addition, agglomerated tantalum particles (X) tend to exhibit insufficient binding forces between the secondary particles of tantalum. However, the micro-particles produced by agglomerated tantalum particles (Y) are presumed to serve as a binder and increase the binding forces between the secondary particles of tantalum of agglomerated tantalum particles (X).

Capacitor: A capacitor equipped with an anode obtained by oxidizing the surface of a tantalum pellet, a cathode facing the anode, and a solid electrolyte layer disposed between the anode and cathode is suggested as an example of a capacitor manufactured using the above-described tantalum pellet.

A cathode terminal is connected to the cathode by soldering and the like. In addition, an exterior resin shell is formed around a member composed of the anode, cathode, and solid electrolyte layer.

Examples of materials used to form the cathode include graphite, silver, and the like.

Examples of materials used to form the solid electrolyte layer include manganese dioxide, lead oxide, electrically conductive polymers, and the like.

When oxidizing the surface of a tantalum pellet, it is suggested, for example, to use a method that involves treating the pellet for 1-3 hours in an electrolyte solution such as nitric acid, phosphoric acid and the like with a concentration of 0.1 wt % at a temperature of 30-90° C. by increasing the voltage to 20-60V at a current density of 40-80 mA/g. A dielectric oxide film is formed in the portion oxidized at such time.

Using the above-described tantalum pellet makes it possible to fabricate an anode that has a large dielectric oxide film area and is filled with a solid electrolyte to a sufficient degree. For this reason, it is possible to obtain a capacitor of high electrical capacitance.

WORKING EXAMPLES

Working Example 1-1

20 kg of potassium fluoride and 20 kg of potassium chloride were charged into a 50-L nickel reactor equipped with a stirring impeller. After de-moisturizing the charged compounds for 1 hour at 200° C., they were melted at 800° C. and stirred with the stirring impeller at 150 RPM. 130.9 g of potassium fluorotantalate were dissolved in the reactor while introducing nitrogen gas at 3 L/min. 39.3 g of sodium were added one minute after that. The addition of the potassium fluorotantalate and sodium was repeated 28 times. After that, the agglomerates produced by the reaction were washed with water, acid washed using an aqueous solution of hydrofluoric acid, and dried at 120° C., thereby yielding melt-reduced secondary particles of tantalum. The bulk density of the melt-reduced secondary particles of tantalum was 0.70 g/cm$^3$ and their BET specific surface area was 5.84 m$^2$/g.

1387 g of the obtained melt-reduced secondary particles of tantalum were introduced into a "Spartan Granulator" (brand name) made by Fuji Paudal Co., Ltd. The particles were then stirred for 2 minutes using the high-speed impeller at 3000 RPM and the low-speed impeller at 27 RPM. After that, with the high-speed impeller and low-speed impeller still rotating, 10.9 g of a 10 wt % aqueous solution of phosphoric acid and 224.8 g of de-ionized water were successively added by spraying over a period of 3 minutes. After the addition was complete, stirring was continued for another 3 minutes, yielding hydrated aggregates.

The hydrated aggregates were vacuum dried for 16 hours at 120° C. 1 kg of the resultant dry aggregates was placed on a 60-mesh screen (with 250-micron openings), whereupon the screen and its receptacle were vertically vibrated, thereby causing all of the aggregates to pass through the screen over a period of 20 minutes.

Next, all of the powder screened through the 60-mesh screen was placed on a 100-mesh screen (with 150-micron openings) and the screen and its receptacle were vertically vibrated, thereby causing all of the powder to pass through the screen over a period of 5 minutes.

Further, 100 g of the powder screened through the 100-mesh screen were placed on a 200-mesh screen (with 75-micron openings), whereupon the screen and its receptacle were vertically vibrated, thereby causing all of the powder to pass through the screen over a period of 30 minutes.

Thus, the dry aggregates were de-agglomerated into fine particles by passing them through screens with successively smaller openings. In addition, by vibrating them on the receptacle, they were spheronized, yielding spheronized particles.

Next, the spheronized particles were heat treated at 1000° C. for 30 minutes. After adding magnesium in the amount of 5 wt % based on 100 wt % of the heat-treated material, the mixture was subjected to deoxidation treatment by heating at 750° C. Agglomerated particles of tantalum with a bulk density 1.77 g/cm$^3$ and a BET specific surface area of 3.78 m$^2$/g were obtained by repeating this deoxidation treatment one more time.

Working Example 1-2

All of the powder screened through the 200-mesh screen in Working Example 1-1 was placed on a 330-mesh screen (with 45-micron openings). The powder was then de-agglomerated by vertically vibrating the screen and its receptacle. All of the powder was passed through the screen over a period of 40 minutes, yielding spheronized particles.

With the exception of using the thus obtained spheronized particles, the agglomerated particles of tantalum were obtained using the same procedure as in Working Example 1-1.

Working Example 1-3

All of the powder screened through the 200-mesh screen in Working Example 1-1 was placed on a 390-mesh screen (with 38-micron openings). The powder was then de-agglomerated by vertically vibrating the screen and its receptacle. All of the powder was passed through the screen over a period of 60 minutes, yielding spheronized particles.

With the exception of using the thus obtained spheronized particles, the agglomerated particles of tantalum were obtained using the same procedure as in Working Example 1-1.

Working Example 1-4

15 kg of potassium fluoride and 15 kg of potassium chloride were charged into a 50-L nickel reactor equipped with a stirring impeller. After de-moisturizing the charged compounds for 1 hour at 200° C., they were melted at 850° C. and stirred with the stirring impeller at 150 RPM. 150 g of potassium fluorotantalate were dissolved in the reactor while introducing nitrogen gas at 3 L/min. 45 g of sodium were added 30 seconds after that. The addition of the potassium fluorotantalate and sodium was repeated 40 times. After that, the agglomerates produced by the reaction were washed with water, acid washed using an aqueous solution of hydrofluoric acid, and dried at 120° C., thereby yielding melt-reduced secondary particles of tantalum. The bulk density of the melt-reduced secondary particles of tantalum was 0.86 g/cm$^3$ and their BET specific surface area was 5.80 m$^2$/g.

330 g of the obtained melt-reduced secondary particles of tantalum, 330 g of de-ionized water, and 3.3 kg of 5-mm pulverizing balls were charged into a pulverizing vessel. The particles were then pulverized by stirring for 6 hours. Next, the resultant pulverized material was removed from the pulverizing vessel along with the de-ionized water and allowed to stand for 2 hours. After that, hydrated aggregates were obtained by removing the supernatant by decantation.

The hydrated aggregates were vacuum dried for 16 hours at 120° C. 310 g of the resultant dry aggregates were placed on a 60-mesh screen, whereupon the screen and its receptacle were vertically vibrated, thereby causing all of the aggregates to pass through the screen over a period of 10 minutes.

Next, all of the powder screened through the 60-mesh screen was placed on a 100-mesh screen and the screen and its receptacle were vertically vibrated, thereby causing all of the powder to pass through the screen over a period of 2 minutes.

Further, 100 g of the powder screened through the 100-mesh screen were placed on a 200-mesh screen, whereupon the screen and its receptacle were vertically vibrated, thereby causing all of the powder to pass through the screen over a period of 30 minutes.

The thus conducted de-agglomeration and spheronization produced spheronized particles.

Next, the spheronized particles were heat treated at 1150° C. for 30 minutes. After adding magnesium in the amount of 4 wt % based on 100 wt % of the heat-treated material, the mixture was subjected to deoxidation treatment by heating at 750° C. Agglomerated particles of tantalum with a bulk density 1.55 g/cm$^3$ and a BET specific surface area of 3.20 m$^2$/g were obtained by repeating this deoxidation treatment one more time.

Working Example 1-5

All of the powder screened through the 200-mesh screen in Working Example 1-4 was placed on a 330-mesh screen. The powder was then de-agglomerated by vertically vibrating the screen and its receptacle. All of the powder was passed through the screen over a period of 40 minutes, yielding spheronized particles.

With the exception of using the thus obtained spheronized particles, the agglomerated particles of tantalum were obtained using the same procedure as in Working Example 1-4.

Working Example 1-6

All of the powder screened through the 200-mesh screen in Working Example 1-4 was placed on a 390-mesh screen. The powder was then de-agglomerated by vertically vibrating the screen and its receptacle. All of the powder was passed through the screen over a period of 60 minutes, yielding spheronized particles.

With the exception of using the thus obtained spheronized particles, the agglomerated particles of tantalum were obtained using the same procedure as in Working Example 1-4.

Working Example 1-7

With the exception of changing the melting temperature of the potassium fluoride and potassium chloride to 840° C., melt-reduced secondary particles of tantalum were obtained using the same procedure as in Working Example 1-4. The bulk density of the melt-reduced secondary particles of tantalum was 0.60 g/cm$^3$ and their BET specific surface area was 3.87 m$^2$/g.

1197 g of the obtained melt-reduced secondary particles of tantalum were charged into a "Spartan Granulator" (brand name) made by Fuji Paudal Co., Ltd. The particles were then stirred for 2 minutes using the high-speed impeller at 5400 RPM and the low-speed impeller at 27 RPM. After that, with the high-speed impeller and low-speed impeller still rotating, 5.7 g of a 10 wt % aqueous solution of phosphoric acid and 209.8 g of de-ionized water were successively added by spraying over a period of 3 minutes. After the addition was complete, stirring was continued for another 3 minutes and 50 seconds, yielding hydrated aggregates.

The hydrated aggregates were vacuum dried for 16 hours at 120° C. 1 kg of the resultant dry aggregates was placed on a 60-mesh screen, whereupon the screen and its receptacle were vertically vibrated, thereby causing all of the aggregates to pass through the screen over a period of 20 minutes.

Next, all of the powder screened through the 60-mesh screen was placed on a 100-mesh screen and the screen and its receptacle were vertically vibrated, thereby causing all of the powder to pass through the screen over a period of 5 minutes.

Further, 100 g of the powder screened through the 100-mesh screen were placed on a 200-mesh screen, whereupon the screen and its receptacle were vertically vibrated, thereby causing all of the powder to pass through the screen over a period of 30 minutes.

The thus conducted de-agglomeration and spheronization produced spheronized particles.

Next, the spheronized particles were heat treated at 1150° C. for 30 minutes.

After adding magnesium in the amount of 4 wt % based on 100 wt % of the heat-treated material, the mixture was subjected to deoxidation treatment by heating at 750° C. Agglomerated particles of tantalum with a bulk density 1.75 g/cm$^3$ and a BET specific surface area of 2.90 m$^2$/g were obtained by repeating this deoxidation treatment one more time.

Working Example 1-8

All of the powder screened through the 200-mesh screen in Working Example 1-7 was placed on a 330-mesh screen. The powder was then de-agglomerated by vertically vibrating the screen and its receptacle. All of the powder was passed through the screen over a period of 40 minutes, yielding spheronized particles.

With the exception of using the thus obtained spheronized particles, the agglomerated particles of tantalum were obtained using the same procedure as in Working Example 1-7.

Working Example 1-9

All of the powder screened through the 200-mesh screen in Working Example 1-7 was placed on a 390-mesh screen. The powder was then de-agglomerated by vertically vibrating the screen and its receptacle. All of the powder was passed through the screen over a period of 60 minutes, yielding spheronized particles.

With the exception of using the thus obtained spheronized particles, the agglomerated particles of tantalum were obtained using the same procedure as in Working Example 1-7.

Working Example 1-10

The amount of de-ionized water charged into the pulverizing vessel in Working Example 1-4 was changed to 165 g. In addition, an antistatic plastic bag was placed under the screen instead of a receptacle, and the screened powder was not vibrated. With the exception of the above, the agglomerated particles of tantalum were obtained using the same procedure as in Working Example 1-4.

Working Example 1-11

With the exception of changing the amount of de-ionized water charged into the pulverizing vessel in Working Example 1-5 to 165 g, the agglomerated particles of tantalum were obtained using the same procedure as in Working Example 1-5.

Working Example 1-12

With the exception of changing the amount of de-ionized water charged into the pulverizing vessel in Working Example 1-6 to 165 g, the agglomerated particles of tantalum were obtained using the same procedure as in Working Example 1-6.

Working Example 1-13

1400 g of melt-reduced secondary particles of tantalum obtained using the same procedure as in Working Example 1-1 were charged into a "Spartan Granulator" (brand name) made by Fuji Paudal Co., Ltd. The particles were then stirred for 2 minutes using the high-speed impeller at 3000 RPM and the low-speed impeller at 27 RPM. After that, with the high-speed impeller and low-speed impeller still rotating, 10.4 g of a 10 wt % aqueous solution of phosphoric acid and 227.6 g of de-ionized water were successively added by spraying over a period of 3 minutes. After the addition was complete, stirring was continued for another 3 minutes, yielding hydrated aggregates.

The hydrated aggregates were vacuum dried for 16 hours at 120° C. 1 kg of the resultant dry aggregates was placed on a 60-mesh screen (with 250-micron openings), whereupon the screen and its receptacle were vertically vibrated, thereby causing all of the aggregates to pass through the screen over a period of 20 minutes.

Next, all of the powder screened through the 60-mesh screen was placed on a 100-mesh screen (with 150-micron openings) and the screen and its receptacle were vertically vibrated, thereby causing all of the powder to pass through the screen over a period of 5 minutes.

Next, all of the powder screened through the 100-mesh screen was placed on a 160-mesh screen (with 90-micron openings) and the screen and its receptacle were vertically vibrated, thereby causing all of the powder to pass through the screen over a period of 5 minutes.

Further, 100 g of the powder screened through the 160-mesh screen were placed on a 200-mesh screen (with 75-micron openings), whereupon the screen and its receptacle were vertically vibrated, thereby causing all of the powder to pass through the screen over a period of 10 minutes.

Thus, the dry aggregates were de-agglomerated into fine particles by passing them through screens with successively smaller openings. In addition, by vibrating them on the receptacle, they were spheronized, yielding spheronized particles.

Next, the spheronized particles were heat treated at 1000° C. for 30 minutes. After adding magnesium in the amount of 5 wt % based on 100 wt % of the heat-treated material, the mixture was subjected to deoxidation treatment by heating at 750° C. Agglomerated particles of tantalum with a bulk density 1.65 g/cm$^3$ and a BET specific surface area of 3.80 m$^2$/g were obtained by repeating this deoxidation treatment one more time.

In this example, the total screen passage time of the dry aggregates was 40 minutes, which is shorter than the 55-minute screen passage time in Working Example 1-1, in which the 160-mesh screen was not used.

Working Example 1-14

With the exception of changing the amount of the 10 wt % aqueous solution of phosphoric acid added to the secondary particles of tantalum in Working Example 1-1 to 10.4 g and the amount of the de-ionized water to 269.6 g, agglomerated particles of tantalum with bulk density of 1.53 g/cm$^3$ and BET specific surface area of 4.00 m$^2$/g were obtained using the same procedure as in Working Example 1-1.

Working Example 1-15

With the exception of changing the amount of the 10 wt % aqueous solution of phosphoric acid added to the secondary particles of tantalum in Working Example 1-1 to 10.4 g and the amount of the de-ionized water to 339.6 g, agglomerated particles of tantalum with bulk density of 1.22 g/cm$^3$ and BET specific surface area of 4.30 m$^2$/g were obtained using the same procedure as in Working Example 1-1.

The agglomerated particles of tantalum of Working Example 1-15, which were obtained by increasing the amount of de-ionized water added to the secondary particles of tantalum, had a lower bulk density.

Comparative Example 1-1

Melt-reduced secondary particles of tantalum were obtained using the same procedure as in Working Example 1-1. Next, these melt-reduced secondary particles of tantalum were mixed with ammonium hexafluorophosphate (NH$_4$PF$_6$). The thus obtained mixture was agglomerated by heat treating it at 1000° C. under a reduced pressure of 10$^{-4}$ Pa for 10 minutes, yielding agglomerates.

The resultant agglomerates were pre-pulverized in a chopper mill. Subsequently, in a de-agglomeration step, the pre-pulverized powder was de-agglomerated in a roll granulator equipped with 3 stages of differential rolls with a total length of 100 mm, yielding agglomerated particles of tantalum. Here, the differential rolls used in the first stage had an inter-roll spacing set to 0.6 mm, those used in the second stage had an inter-roll spacing set to 0.3 mm, and those used in the third stage had an inter-roll spacing set to 0.2 mm. In addition, the circumferential speed of one of the rolls was set to a speed that was 30% faster than the circumferential speed of the other roll.

Volume-mean particle size distribution curves were obtained for the agglomerated particles of tantalum of Working Examples 1-1~1-15 and Comparative Example 1-1 using the laser diffraction and scattering technique (measuring apparatus: the Microtrac MT3000 from Nikkiso Co., Ltd.). FIG. 6 shows the particle size distribution curves of Working Examples 1-1~1-3 and FIG. 7 shows the particle size distribution curves of Working Examples 1-4~1-6. FIG. 8 shows the particle size distribution curves of Working Examples 1-6~1-9 and FIG. 9 shows the particle size distribution curves of Working Examples 1-10~1-12. FIG. 10 shows the particle size distribution curve of Comparative Example 1-1 and FIG. 11 shows the particle size distribution curves of Working Examples 1-13~1-15.

In addition, bulk densities were obtained for the agglomerated particles of tantalum of Working Examples 1-1~1-15 and Comparative Example 1-1 by measuring the weight of 100 cm$^3$. The results of the bulk density measurements are listed in Table 1.

In addition, nitrogen gas was adsorbed on the agglomerated particles of tantalum of Working Examples 1-1~1-15 and Comparative Example 1-1, whereupon mono-layer adsorption values were obtained using the BET equation and BET specific surface areas were further obtained based on the mono-layer adsorption values. The results of the BET specific surface area measurements are listed in Table 1.

TABLE 1

| | Secondary Particles of Tantalum | | Aggregation Step | | | Agglomerated Particles of Tantalum | |
|---|---|---|---|---|---|---|---|
| | Bulk Density (g/cm$^3$) | BET Specific Surface Area (m$^2$/g) | Equipment Used | Amount of De-ionized Water Added (g) | Spheronization Step Mesh Used | Total Screen Passage Time (min) | Bulk Density (g/cm$^3$) | BET Specific Surface Area (m$^2$/g) |
| Working Example 1-1 | 0.70 | 5.84 | Spartan Granulator | 224.8 | 60/100/200 | 55 | 1.77 | 3.78 |

TABLE 1-continued

| | Secondary Particles of Tantalum | | | Aggregation Step | | | Agglomerated Particles of Tantalum | |
|---|---|---|---|---|---|---|---|---|
| | Bulk Density (g/cm³) | BET Specific Surface Area (m²/g) | Equipment Used | Amount of De-ionized Water Added (g) | Spheronization Step Mesh Used | Total Screen Passage Time (min) | Bulk Density (g/cm³) | BET Specific Surface Area (m²/g) |
| Working Example 1-2 | | | | | 60/100/200/330 | 95 | 1.48 | 3.65 |
| Working Example 1-3 | | | | | 60/100/200/390 | 115 | 1.47 | 5.00 |
| Working Example 1-4 | 0.86 | 5.80 | Ball Mill | 330.0 | 60/100/200 | 42 | 1.55 | 3.20 |
| Working Example 1-5 | | | | | 60/100/200/330 | 82 | 1.32 | 3.22 |
| Working Example 1-6 | | | | | 60/100/200/390 | 102 | 1.23 | 4.53 |
| Working Example 1-7 | 0.60 | 3.87 | Spartan Granulator | 209.8 | 60/100/200 | 55 | 1.75 | 2.90 |
| Working Example 1-8 | | | | | 60/100/200/330 | 95 | 1.29 | 2.80 |
| Working Example 1-9 | | | | | 60/100/200/390 | 115 | 1.37 | 3.78 |
| Working Example 1-10 | 0.86 | 5.80 | Ball Mill | 165.0 | 60/100/200 | 42 | 1.68 | 2.89 |
| Working Example 1-11 | | | | | 60/100/200/330 | 82 | 1.51 | 2.95 |
| Working Example 1-12 | | | | | 60/100/200/390 | 102 | 1.38 | 4.17 |
| Working Example 1-13 | 0.70 | 5.84 | Spartan Granulator | 227.6 | 60/100/160/200 | 40 | 1.65 | 3.80 |
| Working Example 1-14 | | | | 269.6 | 60/100/200 | 55 | 1.53 | 4.00 |
| Working Example 1-15 | | | | 339.6 | 60/100/200 | 55 | 1.22 | 4.30 |
| Comparative Example 1-1 | 0.70 | 5.84 | — | — | — | — | 1.80 | 3.96 |

As shown in Table 1 and FIGS. 6-9 and 11, the agglomerated particles of tantalum of Working Examples 1-1~1-15 had small particle sizes, narrow particle size distributions and, at the same time, low bulk densities. It should be noted that in Working Examples 1-1~1-15 the agglomerated particles of tantalum were fabricated by pulverizing melt-reduced secondary particles of tantalum, obtaining dry aggregates by aggregating and drying the particles and passing the dry aggregates through screens to de-agglomerate them, and then spheronizing the aggregates on the receptacles.

By contrast, the agglomerated particles of tantalum of Comparative Example 1-1 had a broader particle size distribution. It should be noted that in Comparative Example 1-1 agglomerated particles of tantalum were fabricated without pulverizing melt-reduced secondary particles of tantalum, by obtaining agglomerates through agglomeration and de-agglomerating these agglomerates in a roll granulator.

In addition, capacitors utilizing the agglomerated particles of tantalum of Working Examples 1-1~1-15 and Comparative Example 1-1 were subjected to evaluation.

Specifically, first of all, compacts with a diameter of 3 mm and a density of 6.0 g/cm³ were fabricated by compression molding 0.15 g of the agglomerated particles of tantalum. Tantalum pellets made up of sintered porous bodies were then obtained by heating these compacts at 1200° C. for 20 minutes in a vacuum sintering furnace.

Subsequently, the resultant tantalum pellets were subjected to oxidation by chemical conversion in a 0.1 volume percent aqueous solution of phosphoric acid at a chemical conversion voltage of 10V and a temperature 60° C. using a holding time of 120 minutes, thereby forming a dielectric oxide film on their surface.

The sintered porous bodies that had the dielectric oxide film formed thereon were immersed in a 30.5 volume percent aqueous solution of sulfuric acid. Their electrical capacitances (CV values) were then measured at a bias voltage of 1.5V and a frequency of 120 Hz. Under this measurement method, the aqueous solution of sulfuric acid was the electrolyte and cathode. The results of the electrical capacitance measurements are listed in Table 2.

TABLE 2

| | CV Value (μFV/g) |
|---|---|
| Working Example 1-1 | 168800 |
| Working Example 1-2 | 168200 |
| Working Example 1-3 | 164900 |
| Working Example 1-4 | 133000 |
| Working Example 1-5 | 133300 |
| Working Example 1-6 | 140100 |
| Working Example 1-7 | 135100 |
| Working Example 1-8 | 135000 |
| Working Example 1-9 | 139900 |
| Working Example 1-10 | 135100 |
| Working Example 1-11 | 132500 |
| Working Example 1-12 | 145000 |
| Comparative 1-1 | 165700 |

The capacitors fabricated using the agglomerated particles of tantalum of Working Examples 1-1~1-12 had high electrical capacitances.

The capacitors fabricated using the agglomerated particles of tantalum of Comparative Example 1-1 had the same electrical capacitance as in Working Examples 1-1~1-12. However, they required more time for filling with solid electrolyte.

Working Example 1-16

Tantalum chloride was vaporized by heating to 250° C. and supplied to the reactor at a rate of 20 cm³/min while sodium was vaporized by heating to 900° C. and supplied to the reactor at a rate of 100 cm³/min. As a result, vapor phase-reduced secondary particles of tantalum were obtained. It should be noted that, during the reaction, argon gas heated to 750° C. was supplied to the reactor at a rate of 500 cm³/min.

These vapor phase-reduced secondary particles of tantalum were water washed, acid washed with an aqueous solution of hydrofluoric acid, and dried at 120° C. After the acid wash, the bulk density of the vapor phase-reduced secondary particles of tantalum was 1.00 g/cm³ and their BET specific surface area was 8.00 m²/g.

330 g of the resultant vapor phase-reduced secondary particles of tantalum, 330 g of de-ionized water, and 3.3 kg of 5-mm pulverizing balls were charged into a pulverizing vessel. The particles were then pulverized by stirring for 6 hours. Next, the resultant pulverized material was removed from the pulverizing vessel along with the de-ionized water and allowed to stand for 2 hours. After that, hydrated aggregates were obtained by removing the supernatant by decantation.

The hydrated aggregates were vacuum dried for 16 hours at 120° C. 310 g of the resultant dry aggregates were placed on a 60-mesh screen, whereupon the screen and its receptacle were vertically vibrated, thereby causing all of the aggregates to pass through the screen over a period of 10 minutes.

Next, all of the powder screened through the 60-mesh screen was placed on a 100-mesh screen and the screen and its receptacle were vertically vibrated, thereby causing all of the powder to pass through the screen over a period of 2 minutes.

Further, 100 g of the powder screened through the 100-mesh screen were placed on a 200-mesh screen, whereupon the screen and its receptacle were vertically vibrated, thereby causing all of the powder to pass through the screen over a period of 30 minutes.

The thus conducted de-agglomeration and spheronization produced spheronized particles.

Next, the spheronized particles were heat treated at 1000° C. for 30 minutes. After adding magnesium in the amount of 4 wt % based on 100 wt % of the heat-treated material, the mixture was subjected to deoxidation treatment by heating at 750° C. Agglomerated particles of tantalum with a bulk density 1.20 g/cm³ and a BET specific surface area of 4.60 m²/g were obtained by repeating this deoxidation treatment one more time.

Working Example 1-17

All of the powder screened through the 200-mesh screen in Working Example 1-16 was placed on a 330-mesh screen. The powder was then de-agglomerated by vertically vibrating the screen and its receptacle. All of the powder was passed through the screen over a period of 40 minutes, yielding spheronized particles.

With the exception of using the thus obtained spheronized particles, the agglomerated particles of tantalum were obtained using the same procedure as in Working Example 1-16.

Working Example 1-18

All of the powder screened through the 200-mesh screen in Working Example 1-16 was placed on a 390-mesh screen. The powder was then de-agglomerated by vertically vibrating the screen and its receptacle. All of the powder was passed through the screen over a period of 60 minutes, yielding spheronized particles.

With the exception of using the thus obtained spheronized particles, the agglomerated particles of tantalum were obtained using the same procedure as in Working Example 1-16.

Working Example 1-19

1387 g of vapor phase-reduced secondary particles of tantalum obtained using the same procedure as in Working Example 1-16 were charged into a Spartan Granulator (brand name) made by Fuji Paudal Co., Ltd. The particles were then stirred for 2 minutes using the high-speed impeller at 3000 RPM and the low-speed impeller at 27 RPM. After that, with the high-speed impeller and low-speed impeller still rotating, 19.0 g of a 10 wt % aqueous solution of phosphoric acid and 481 g of de-ionized water were successively added by spraying over a period of 3 minutes. After the addition was complete, stirring was continued for another 3 minutes, yielding hydrated aggregates.

The hydrated aggregates were vacuum dried for 16 hours at 120° C. 2 kg of the resultant dry aggregates were placed on a 60-mesh screen (with 250-micron openings), whereupon the screen and its receptacle were vertically vibrated, thereby causing all of the aggregates to pass through the screen over a period of 20 minutes.

Next, all of the powder screened through the 60-mesh screen was placed on a 100-mesh screen (with 150-micron openings) and the screen and its receptacle were vertically vibrated, thereby causing all of the powder to pass through the screen over a period of 5 minutes.

Thus, the dry aggregates were de-agglomerated into fine particles by passing them through screens with successively smaller openings. In addition, by vibrating them on the receptacle, they were spheronized, yielding spheronized particles.

Next, the spheronized particles were heat treated at 950° C. for 20 minutes. After adding magnesium in the amount of 5 wt % based on 100 wt % of the heat-treated material, the mixture was subjected to deoxidation treatment by heating at 750° C. Agglomerated particles of tantalum with a bulk density 1.50 g/cm³ and a BET specific surface area of 5.20 m²/g were obtained by repeating this deoxidation treatment one more time.

Working Example 1-20

All of the powder screened through the 100-mesh screen in Working Example 1-19 was placed on a 235-mesh screen (with 63-micron openings). The powder was then de-agglomerated by vertically vibrating the screen and its receptacle. All of the powder was passed through the screen over a period of 30 minutes, yielding spheronized particles.

With the exception of using the thus obtained spheronized particles, the agglomerated particles of tantalum were obtained using the same procedure as in Working Example 1-19.

Working Example 1-21

With the exception of changing the heat treatment temperature used in Working Example 1-19 to 1000° C., the agglomerated particles of tantalum were obtained using the same procedure as in Working Example 1-19.

Working Example 1-22

With the exception of changing the heat treatment temperature used in Working Example 1-20 to 1000° C., the agglomerated particles of tantalum were obtained using the same procedure as in Working Example 1-20.

Working Example 1-23

With the exception of using vapor phase-reduced secondary particles of tantalum with a bulk density of 1.00 g/cm$^3$ and a BET specific surface area of 11.60 m$^2$/g instead of the ones used in Working Example 1-21, the agglomerated particles of tantalum were obtained using the same procedure as in Working Example 1-21.

Working Example 1-24

With the exception of using vapor phase-reduced secondary particles of tantalum with a bulk density of 1.00 g/cm$^3$ and a BET specific surface area of 11.60 m$^2$/g instead of the ones used in Working Example 1-22, the agglomerated particles of tantalum were obtained using the same procedure as in Working Example 1-22.

Working Example 1-25

With the exception of using vapor phase-reduced secondary particles of tantalum with a bulk density of 1.00 g/cm$^3$ and a BET specific surface area of 14.00 m$^2$/g instead of the ones used in Working Example 1-22 and setting the temperature of the deoxidation treatment to 700° C., the agglomerated particles of tantalum were obtained using the same procedure as in Working Example 1-22.

Comparative Example 1-2

2000 g of secondary particles of tantalum obtained using the same procedure as in Working Example 1-1 were charged into the vessel (diameter: 20 cm) of the granulating apparatus (the Spartan Granulator from Fuji Paudal Co., Ltd.). Next, the particles were pre-mixed by stirring them for 2 minutes using the low-speed impeller and high-speed impeller. At such time, the rotational speed of the low-speed impeller was set to 27 RPM (circumferential speed: 17 m/sec) and the rotational speed of the high-speed impeller was set to 5400 RPM.

Subsequently, the secondary particles of tantalum inside the vessel were stirred for 4 minutes while spraying 19.0 g of a 10 wt % aqueous solution of phosphoric acid and 382.9 g of de-ionized water at a constant rate from a sprayer. After that, stirring was performed for another 10 minutes without adding water. At such time, the rotational speed of the low-speed impeller was set to 27 RPM and the rotational speed of the high-speed impeller was set to 5400 RPM.

The granulated powder obtained as described above was vacuum dried for 11 hours at 70° C., yielding a dry powder. Agglomerated particles of tantalum were then obtained by sintering this dry powder in a vacuum for 1 hour at 950° C.

Volume-mean particle size distribution curves were obtained for the agglomerated particles of tantalum of Working Examples 1-16~1-25 and Comparative Example 1-2 using the laser diffraction and scattering technique (measuring apparatus: the Microtrac MT3000 from Nikkiso Co., Ltd.). FIG. 12 shows the particle size distribution curves of Working Examples 1-16~1-18 and FIG. 13 shows the particle size distribution curves of Working Examples 1-19~1-22. FIG. 14 shows the particle size distribution curves of Working Examples 1-23~1-25 and Comparative Example 1-2.

In addition, bulk density and BET specific surface area values were obtained for the agglomerated particles of tantalum of Working Examples 1-16~1-25 and Comparative Example 1-2. The results of the bulk density and BET specific surface area measurements are listed in Table 3.

TABLE 3

| | Secondary Particles of Tantalum | | Aggregation | | Heat Treatment Step | Agglomerated Particles of Tantalum | |
|---|---|---|---|---|---|---|---|
| | Bulk Density (g/cm$^3$) | BET Specific Surface Area (m$^2$/g) | Step Equipment Used | Spheronization Step Mesh Used | Heat Treatment Temperature (° C.) | Bulk Density (g/cm$^3$) | BET Specific Surface Area (m$^2$/g) |
| Working Example 1-16 | 1.00 | 8.00 | Ball Mill | 60/100/200 | 1000 | 1.20 | 4.60 |
| Working Example 1-17 | | | | 60/100/200/330 | | 1.30 | 4.40 |
| Working Example 1-18 | | | | 60/100/200/390 | | 1.30 | 6.30 |
| Working Example 1-19 | | | Spartan Granulator | 60/100 | 950 | 1.50 | 5.20 |
| Working Example 1-20 | | | | 60/100/235 | | 1.30 | 5.00 |
| Working Example 1-21 | | | | 60/100 | 1000 | 1.60 | 5.20 |
| Working Example 1-22 | | | | 60/100/235 | | 1.30 | 4.60 |
| Working Example 1-23 | 1.00 | 11.60 | | 60/100 | | 1.58 | 5.17 |

TABLE 3-continued

| | Secondary Particles of Tantalum | | Aggregation | | Heat Treatment Step | Agglomerated Particles of Tantalum | |
|---|---|---|---|---|---|---|---|
| | Bulk Density (g/cm³) | BET Specific Surface Area (m²/g) | Step Equipment Used | Spheronization Step Mesh Used | Heat Treatment Temperature (° C.) | Bulk Density (g/cm³) | BET Specific Surface Area (m²/g) |
| Working Example 1-24 | | | | 60/100/235 | | 1.29 | 4.86 |
| Working Example 1-25 | 1.00 | 14.00 | | 60/100 | | 1.78 | 9.40 |
| Comparative Example 1-2 | 0.70 | 5.84 | — | — | — | 2.30 | 5.20 |

As shown in Table 3 and FIG. 12-14, the agglomerated particles of tantalum of Working Examples 1-16~1-25 had small particle sizes, narrow particle size distributions and, at the same time, low bulk densities. It should be noted that in Working Examples 1-16~1-25 the agglomerated particles of tantalum were fabricated by pulverizing vapor phase-reduced secondary particles of tantalum, obtaining dry aggregates by aggregating and drying the particles and passing the dry aggregates through screens to de-agglomerate them, and then spheronizing the aggregates on the receptacles.

By contrast, the agglomerated particles of tantalum of Comparative Example 1-2 had a larger particle size and a higher bulk density. It should be noted that in Comparative Example 1-2 agglomerated particles of tantalum were fabricated by granulating melt-reduced secondary particles of tantalum using only a granulating apparatus.

In addition, the particle strength of the agglomerated particles of tantalum of Working Examples 1-16~1-25 and Comparative Example 1-2 was subjected to evaluation.

The particle size was measured while irradiating the particles with ultrasound using an ultrasonication apparatus incorporated into the particle size distribution analyzer (the Microtrac from Nikkiso Co., Ltd., i.e., the Microtrac AVSR ASVR (circulation system) and the Microtrac HRA 9320-×100 (optical system)), thereby obtaining the cumulative fraction (%) of particles of 3 μm or less. The cumulative fractions (%) of particles of 3 μm or less measured simultaneously with ultrasonication were used to evaluate the strength of the particles. It should be noted that the intensity of the ultrasound was set to 25 W and the irradiation time was set to 20 minutes. The obtained cumulative fractions (%) of particles of 3 μm or less are shown in Table 4.

The larger the cumulative fraction (%) of particles of 3 μm or less after ultrasonication, the weaker the strength of the particles. In addition, when the cumulative fraction (%) of particles of 3 μm or less is too large, micro-powder gets into the clearance between the male mold and female mold of the molding machine during the manufacture of pellets for capacitors. For this reason, it is undesirable in agglomerated particles of tantalum used in capacitors.

TABLE 4

| | Cumulative fraction (%) of particles of 3 μm or less | | | |
|---|---|---|---|---|
| Ultrasonication Time | 0 min | 5 min | 10 min | 20 min |
| Working Example 1-16 | 48.8 | 75.1 | 78.2 | 76.7 |
| Working Example 1-17 | 53.8 | 76.6 | 78.8 | 78.9 |
| Working Example 1-18 | 40.5 | 65.4 | 73.8 | 79.7 |
| Working Example 1-19 | 16.9 | 40.1 | 48.3 | 54.8 |
| Working Example 1-20 | 14.1 | 32.0 | 39.7 | 46.7 |

TABLE 4-continued

| | Cumulative fraction (%) of particles of 3 μm or less | | | |
|---|---|---|---|---|
| Ultrasonication Time | 0 min | 5 min | 10 min | 20 min |
| Working Example 1-21 | 10.3 | 36.1 | 44.8 | 53.4 |
| Working Example 1-22 | 8.3 | 24.9 | 32.6 | 40.3 |
| Working Example 1-23 | 15.2 | 39.2 | 46.9 | 54.6 |
| Working Example 1-24 | 12.6 | 31.7 | 40.5 | 49.6 |
| Working Example 1-25 | 2.4 | 21.0 | 31.1 | 39.0 |
| Comparative Example 1-2 | 19.4 | 45.7 | 53.3 | 60.5 |

The agglomerated particles of tantalum of Working Examples 1-19~1-25 exhibited little change in the cumulative fraction of particles of 3 μm of less before and after ultrasonication and the cumulative fraction of particles of 3 μm or less after ultrasonication was small. Therefore, the strength of the particles was high. It should be noted that in Working Examples 1-19~1-25, the agglomerated particles of tantalum were fabricated by pulverizing vapor phase-reduced secondary particles of tantalum in a granulating apparatus and spheronizing them by screening.

By comparison, the agglomerated particles of tantalum of Working Examples 1-16~1-18 contained a larger cumulative fraction of particles of 3 μm or less after ultrasonication. Therefore, the strength of the particles was insufficient. It should be noted that in Working Examples 1-16~1-18, the agglomerated particles of tantalum were fabricated by pulverizing vapor phase-reduced secondary particles of tantalum in a pulverizing machine and spheronizing them by screening.

In addition, the agglomerated particles of tantalum of Comparative Example 1-2 contained a larger cumulative fraction (%) of particles of 3 μm or less after ultrasonication.

In addition, with the exception of fabricating compacts with a density 4.5 g/cm³ from the agglomerated particles of tantalum of Working Examples 1-19~1-22, the electrical capacitance obtained when they were used in capacitors was measured in the same manner as in Working Examples 1-1~1-12 and Comparative Example 1-1. The results of the electrical capacitance measurements are listed in Table 5.

As shown in Table 5, using the agglomerated particles of tantalum of Working Examples 1-19~1-22 made it possible to obtain capacitors of high electrical capacitance.

TABLE 5

| | CV Value (μFV/g) |
|---|---|
| Working Example 1-19 | 227400 |
| Working Example 1-20 | 233000 |
| Working Example 1-21 | 229400 |
| Working Example 1-22 | 224500 |

Next, unless otherwise indicated, in the experimental examples below, "%" designates wt %.

Manufacture of Secondary Particles of Tantalum: 20 kg of potassium fluoride and 20 kg of potassium chloride were charged into the 50-L nickel reactor shown in FIG. 1. After de-moisturizing the charged compounds for 1 hour at 200° C., they were melted at 800° C. and stirred by operating the stirrer 34 at 150 RPM. 196.4 g of potassium fluorotantalate were dissolved in the reactor while introducing nitrogen gas at 3 L/min. 59.0 g of sodium were added one minute after that. The addition of the potassium fluorotantalate and sodium was repeated 28 times. After that, the agglomerates produced by the reaction were washed with water, acid washed using an aqueous solution of hydrofluoric acid, and dried at 120° C., thereby yielding secondary particles of tantalum (A1). The bulk density of these secondary particles of tantalum (A1) was 0.40 g/cm$^3$ and their BET specific surface area was 4.13 m$^2$/g.

Experimental Examples 2-1~2-5

800 g of the secondary particles of tantalum (A1) were charged into the Spartan Granulator from Fuji Paudal Co., Ltd. shown in FIG. 3.

Next, the secondary particles of tantalum (A1) inside the vessel were pre-mixed by stirring them for 2 minutes using the low-speed impeller 12 and high-speed impeller 13. At such time, the rotational speed of the low-speed impeller was set to 27 RPM (circumferential speed: 17 m/sec) and the rotational speed of the high-speed impeller 13 was set to 5400 RPM.

Subsequently, the secondary particles of tantalum inside the vessel were stirred for 4 minutes while spraying 3.8 g of a 10 wt % aqueous solution of phosphoric acid and 148.6 g of de-ionized water at a constant rate from a sprayer. After that, stirring was performed for another 10 minutes without adding water. At such time, the rotational speed of the low-speed impeller was maintained at 27 RPM and the rotational speed of the high-speed impeller 13 was maintained at 5400 RPM.

Dry aggregates were obtained by drying the resultant hydrated aggregates at 70° C. for 11 hours. The dry aggregates were then heated in a vacuum for 1 hour at 900° C. and then sintered by further heating them in a vacuum for 30 minutes at 1150° C. After adding magnesium in the amount of 4 wt % based on 100 wt % of the heat-treated material, the mixture was subjected to deoxidation treatment by heating at 750° C. Agglomerated particles (X1) with a bulk density 1.50 g/cm$^3$ and a BET specific surface area of 3.09 m$^2$/g were obtained by repeating this deoxidation treatment one more time.

800 g of the secondary particles of tantalum (A1) were charged into the Spartan Granulator from Fuji Paudal Co., Ltd. shown in FIG. 3.

Next, the secondary particles of tantalum inside the vessel were pre-mixed by stirring them for 2 minutes using the low-speed impeller 12 and high-speed impeller 13. At such time, the rotational speed of the low-speed impeller was set to 27 RPM (circumferential speed: 17 m/sec) and the rotational speed of the high-speed impeller 13 was set to 3000 RPM.

Subsequently, the secondary particles of tantalum inside the vessel were stirred for 3 minutes while spraying 3.8 g of a 10 wt % aqueous solution of phosphoric acid and 148.6 g of de-ionized water at a constant rate from a sprayer.

After that, stirring was performed for 3 minutes without adding the aqueous solution of phosphoric acid or water. At such time, the rotational speed of the low-speed impeller was maintained at 27 RPM and the rotational speed of the high-speed impeller 13 was maintained at 3000 RPM.

Dry aggregates were obtained by vacuum drying the resultant hydrated aggregates at 120° C. for 16 hours. 1 kg of these dry aggregates was then placed on a 60-mesh screen (with 250-micron openings), whereupon the screen and its receptacle were vertically vibrated, thereby causing all of the aggregates to pass through the screen over a period of 20 minutes.

Next, all of the powder screened through the 60-mesh screen was placed on a 100-mesh screen (with 150-micron openings) and the screen and its receptacle were vertically vibrated, thereby causing all of the powder to pass through the screen over a period of 5 minutes.

Further, 100 g of the powder screened through the 100-mesh screen were placed on a 200-mesh screen (with 75-micron openings), whereupon the screen and its receptacle were vertically vibrated, thereby causing all of the powder to pass through the screen over a period of 30 minutes.

All of the powder screened through the 200-mesh screen was then placed on a 330-mesh screen (with 45-micron openings) and the screen and its receptacle were vertically vibrated, thereby causing all of the powder to pass through the screen over a period of 60 minutes. As a result, spheronized particles were obtained.

Thus, the dry aggregates were de-agglomerated into fine particles by passing them through screens with successively smaller openings. In addition, by vibrating them on the receptacle, they were spheronized, yielding spheronized particles.

Next, the spheronized particles were heat treated at 1150° C. for 30 minutes. After adding magnesium in the amount of 4 wt % based on 100 wt % of the heat-treated material, the mixture was subjected to deoxidation treatment by heating at 750° C. Agglomerated particles (Y1) with a bulk density 1.29 g/cm$^3$ and a BET specific surface area of 2.80 m$^2$/g were obtained by repeating this deoxidation treatment one more time.

The powders of Experimental Examples 2-1~2-5 were obtained by mixing agglomerated particles (X1) with agglomerated particles (Y1) in accordance with the weight ratios listed in Table 6. The mixing operation was performed by weighing X1 and Y1 in predetermined proportions, placing them in an antistatic bag and mixing under an argon atmosphere.

It should be noted that the powder of Experimental Example 2-1 was made up of agglomerated particles (Y1) and the powder of Experimental Example 2-5 was made up of agglomerated particles (X1).

TABLE 6

|  | Agglomerated Particles (X1) | Agglomerated Particles (Y1) |
| --- | --- | --- |
| Experimental Example 2-1 | 0% | 100% |
| Experimental Example 2-2 | 25% | 75% |
| Experimental Example 2-3 | 50% | 50% |
| Experimental Example 2-4 | 75% | 25% |
| Experimental Example 2-5 | 100% | 0% |

The volume-mean particle size distribution curves for the powder of Experimental Example 2-1 (agglomerated particles (Y1)) and the powder of Experimental Example 2-5 (agglomerated particles (X1)) were obtained on the particle size distribution analyzer Microtrac MT3000 from Nikkiso Co., Ltd. (detector unit: the Microtrac HRA 9320-x100 (optical system)) using the laser diffraction and scattering technique.

FIG. 15 shows the particle size distribution curve of Experimental Example 2-1 and FIG. 16 shows the particle size distribution curve of Experimental Example 2-5.

The mode diameter of the powder of Experimental Example 2-1 was 29.8 μm and its median diameter was 31.7 μm. The mode diameter of the powder of Experimental Example 2-5 was 37.0 μm and its median diameter was 34.6 μm.

The cumulative fractions (%) of particles of 3 μm or less for the powder of Experimental Example 2-1 (agglomerated particles (Y1)) and the powder of Experimental Example 2-5 (agglomerated particles (X1)) were obtained by irradiating them with ultrasound using the ultrasonication apparatus incorporated into the particle size distribution analyzer Microtrac MT3000 from Nikkiso Co., Ltd. and measuring the particle size obtained upon lapse of a predetermined treatment time. In addition, the intensity of the ultrasound was set to 25 W. The cumulative fractions (%) of particles of 3 μm or less at 0 min (prior to ultrasonication), 5 min, 10 min, and 20 min are shown in Table 7.

TABLE 7

| Treatment Time | Cumulative Fractions of Particles with Particle Size of 3 μm or less | | | |
|---|---|---|---|---|
| | 0 min | 5 min | 10 min | 20 min |
| Experimental Example 2-1 | 4.9% | 18.7% | 25.9% | 33.8% |
| Experimental Example 2-5 | 0.0% | 0.0% | 3.7% | 5.6% |

The powders of Experimental Examples 2-1~2-5 were used in the amount of 0.15 g to mold disks with a diameter of 3.0 mm and a density of 4.5 g/cm$^3$. Tantalum pellets were produced by sintering the resultant compacts at 1200° C. for 20 minutes.

The porosity distribution of the resultant tantalum pellets was measured on the Autopore IV 9500 from Shimadzu Corporation. The results are shown in FIG. 17. In addition, the weight ratios for different pore size ranges are listed in Table 8. It should be noted that the pore size distribution of FIG. 17 is a cumulative representation starting from larger pore sizes.

TABLE 8

| | Pore Size | | |
|---|---|---|---|
| | Not less than 0.5 μm but less than 0.7 μm | Not less than 0.7 μm but less than 1.0 μm | 1.0 μm or more |
| Experimental Example 2-1 | 0.4% | 0.0% | 0.0% |
| Experimental Example 2-2 | 9.4% | 4.7% | 0.0% |
| Experimental Example 2-3 | 7.4% | 8.1% | 4.5% |
| Experimental Example 2-4 | 5.7% | 6.6% | 14.4% |
| Experimental Example 2-5 | 4.0% | 4.3% | 24.0% |

Experimental Examples 2-6~2-10

800 g of the secondary particles of tantalum (A1) were charged into the Spartan Granulator from Fuji Paudal Co., Ltd. shown in FIG. 3.

Next, the secondary particles of tantalum (A1) inside the vessel were pre-mixed by stirring them for 2 minutes using the low-speed impeller 12 and high-speed impeller 23. At such time, the rotational speed of the low-speed impeller was set to 27 RPM (circumferential speed: 17 m/sec) and the rotational speed of the high-speed impeller 23 was set to 3000 RPM.

Subsequently, the secondary particles of tantalum inside the vessel were stirred for 3 minutes while spraying 3.8 g of a 10 wt % aqueous solution of phosphoric acid and 156.2 g of de-ionized water at a constant rate from a sprayer. After that, stirring was performed for 3 minutes without adding the aqueous solution of phosphoric acid or water. At such time, the rotational speed of the low-speed impeller was maintained at 27 RPM and the rotational speed of the high-speed impeller 23 at 3000 RPM. Dry aggregates were obtained by vacuum drying the resultant hydrated aggregates at 120° C. for 16 hours.

0.5 kg of the resultant dry aggregates was placed on a 60-mesh screen (with 250-micron openings), whereupon the screen and its receptacle were vertically vibrated, thereby separating the particles over a period of 10 minutes.

The powder on the screen was designated as SV particles and the particles that had passed through the screen were designated as SP particles.

All of the SP particles (about 450 g) were heat treated at 1150° C. for 30 minutes.

After adding magnesium in the amount of 5 wt % based on 100 wt % of the heat-treated material, the mixture was subjected to deoxidation treatment by heating at 750° C. Agglomerated particles (X2) with a bulk density 1.84 g/cm$^3$ and a BET specific surface area of 2.89 m$^2$/g were obtained by repeating this deoxidation treatment one more time.

All of the SV particles (about 350 g) were placed on a 100-mesh screen (with 150-micron openings), whereupon the screen and its receptacle were vertically vibrated, thereby causing all of the particles to pass through the screen over a period of 5 minutes.

Further, 100 g of the powder screened through the 100-mesh screen were placed on a 200-mesh screen (with 75-micron openings), whereupon the screen and its receptacle were vertically vibrated, thereby causing all of the powder to pass through the screen over a period of 25 minutes.

Thus, the dry aggregates were de-agglomerated into fine particles by passing them through screens with successively smaller openings. In addition, by vibrating them on the receptacle, they were spheronized, yielding spheronized particles.

Next, the spheronized particles were heat treated at 1150° C. for 30 minutes.

After adding magnesium in the amount of 5 wt % based on 100 wt % of the heat-treated material, the mixture was subjected to deoxidation treatment by heating at 750° C. Agglomerated particles (Y2) with a bulk density 1.63 g/cm$^3$ and a BET specific surface area of 3.04 m$^2$/g were obtained by repeating this deoxidation treatment one more time.

The powders of Experimental Examples 2-6~2-10 were obtained by mixing agglomerated particles (X2) with agglomerated particles (Y2) in accordance with the weight ratios listed in Table 9.

The mixing operation was performed by weighing X2 and Y2 in predetermined proportions, placing them in an antistatic bag and mixing under an argon atmosphere. It should be noted that the powder of Experimental Example 2-6 was made up of agglomerated particles (Y2) and the powder of Experimental Example 2-10 was made up of agglomerated particles (X2).

TABLE 9

|  | Agglomerated Particles (X2) | Agglomerated Particles (Y2) |
|---|---|---|
| Experimental Example 2-6 | 0% | 100% |
| Experimental Example 2-7 | 25% | 75% |
| Experimental Example 2-8 | 50% | 50% |
| Experimental Example 2-9 | 75% | 25% |
| Experimental Example 2-10 | 100% | 0% |

The cumulative fractions (%) of particles of 3 μm or less upon lapse of a predetermined treatment time were obtained for the powder of Experimental Example 2-6 (agglomerated particles (Y2)) and the powder of Experimental Example 2-10 (agglomerated particles (X2)) by irradiating the powders with ultrasound in accordance with the same procedure as in the case of the particle strength evaluation of Experimental Example 2-1 and Experimental Example 2-5.

The cumulative fractions (%) of particles of 3 μm or less at 0 min (prior to ultrasonication), 5 min, 10 min, and 20 min are shown in Table 10.

TABLE 10

| | Cumulative Fraction of Particles with Particle Size of 3 μm or less | | | |
|---|---|---|---|---|
| Treatment Time | 0 min | 5 min | 10 min | 20 min |
| Experimental Example 2-6 | 3.9% | 13.7% | 20.9% | 30.5% |
| Experimental Example 2-10 | 0.0% | 0.0% | 2.7% | 4.6% |

The powders of Experimental Examples 2-6~2-10, each one in the amount of 0.15 g, were used to mold disks with a diameter of 3.0 mm and a density of 4.5 g/cm³. Tantalum pellets were produced by sintering the resultant compacts at 1200° C. for 20 minutes.

The porosity distribution of the obtained tantalum pellets was measured in the same manner as in Experimental Examples 2-1~2-5. The weight ratios for different pore size ranges are listed in Table 11.

TABLE 11

| | Pore Size | | |
|---|---|---|---|
| | Not less than 0.5 μm but less than 0.7 μm | Not less than 0.7 μm but less than 1.0 μm | 1.0 μm or more |
| Experimental Example 2-6 | 0.4% | 0.0% | 0.0% |
| Experimental Example 2-7 | 11.4% | 4.9% | 0.0% |
| Experimental Example 2-8 | 8.4% | 8.0% | 3.5% |
| Experimental Example 2-9 | 5.0% | 6.6% | 13.1% |
| Experimental Example 2-10 | 2.9% | 5.0% | 20.0% |

As can be seen from FIG. 17, Table 8, and Table 11, in Experimental Examples 2-2~2-4 and 2-7~2-9, which correspond to the working examples of the present invention, the pellets had a high ratio of pores with a pore size of not less than 0.7 μm and less than 1 micron. Accordingly, it is believed that the present invention makes it easier to impregnate anodes with a solid electrolyte to a sufficient degree and facilitates the reduction of anode resistance.

By contrast, in the pellets of Experimental Examples 2-1~2-6, there were substantially no pores with a pore size of 0.7 micron or more. For this reason, it is believed that such anodes are difficult to fill with solid electrolytes and their anode resistance tends to be high.

In addition, while in Experimental Examples 2-5 and 2-10 the ratio of pores with pore sizes of at least 0.7 μm but less than 1 micron was high, the ratio of pores with pore sizes of 1 micron or more was also high. For this reason, it is believed that there is considerable excess space that does not contribute to electrostatic capacitance and sufficient electrostatic capacitance cannot be obtained.

INDUSTRIAL APPLICABILITY

The present invention makes it possible to provide low-bulk-density spheroidal agglomerated particles of tantalum with a small particle size and a narrow particle size distribution. A high-surface-area porous tantalum pellet with large-diameter voids can be provided by molding these agglomerated particles of tantalum. A capacitor of high electrical capacitance can be manufactured using this tantalum pellet.

In addition, a mixed tantalum powder of high flowability can be provided. Due to its high flowability, the mixed tantalum powder can be easily charged into the mold when fabricating pellets by molding this mixed tantalum powder. In addition, the problems associated with extracting the male mold from the female mold are also less likely to occur. A tantalum pellet possessing sufficient porosity can be provided by molding this mixed tantalum powder. This tantalum pellet permits fabrication of anodes that can be impregnated with a sufficient amount of solid electrolyte and makes it possible to raise the electrostatic capacitance per unit volume of the capacitor.

Based on the above, the present invention can be suitably applied to technical fields related to agglomerated particles of tantalum intended for use in tantalum electrolytic capacitors, tantalum pellets, and capacitors.

DESCRIPTION OF THE REFERENCE NUMERALS

11, 21. Vessels.
12, 22. Low-speed impellers.
13, 23. High-speed impellers.
14, 24. Sprayer.
30. Melt reaction apparatus.
31. Reactor.
32. Potassium fluorotantalate supply conduit.
33. Sodium supply conduit.
34. Stirring impeller.
35. Heater.
40. Vapor phase reaction apparatus.
41. Reactor.
42. Tantalum chloride supply conduit.
43. Sodium supply conduit.
44. Inert gas supply conduit.
45. Withdrawal conduit.

46. Heater.
47. Exhaust gas conduit.

The invention claimed is:

1. A process for manufacturing a mixed tantalum powder including the steps of:
obtaining agglomerated tantalum particles (X) using the manufacturing process (a) described below;
obtaining agglomerated tantalum particles (Y) using any manufacturing process among the manufacturing processes (b)-(d) described below; and mixing the resultant agglomerated tantalum particles (X) and agglomerated tantalum particles (Y),
manufacturing process (a):
a process for manufacturing agglomerated particles of tantalum including the steps of: obtaining hydrated aggregates by stirring secondary particles of tantalum produced by tantalum salt reduction while adding water thereto in a granulating apparatus provided with a low-speed impeller and a high-speed impeller rotating at a rotational speed that is at least 10 times higher than that of the low-speed impeller; further stirring the hydrated aggregates in the granulating apparatus without adding water; and, after that, obtaining dry aggregates by drying the hydrated aggregates, and sintering the dry aggregates,
manufacturing process (b):
a process for manufacturing agglomerated particles of tantalum including the steps of: obtaining hydrated aggregates by stirring secondary particles of tantalum produced by tantalum salt reduction while adding water thereto in a granulating apparatus provided with a low-speed impeller and a high-speed impeller rotating at a rotational speed that is at least 10 times higher than that of the low-speed impeller; and, after that, obtaining dry aggregates by drying the hydrated aggregates; spheronizing the dry aggregates by passing them through screens; and sintering the spheronized dry aggregates,
manufacturing process (c):
a process for manufacturing agglomerated particles of tantalum including the steps of: obtaining hydrated aggregates by adding water to secondary particles of tantalum produced by tantalum salt reduction and pulverizing them in a pulverizing machine other than the above granulating apparatus; and, after that, obtaining dry aggregates by drying the hydrated aggregates; spheronizing the dry aggregates by passing them through screens; and sintering the spheronized dry aggregates,
manufacturing process (d):
a process for manufacturing agglomerated particles of tantalum including the steps of: obtaining hydrated aggregates by adding water to secondary particles of tantalum obtained by tantalum salt reduction; and, after that, obtaining dry aggregates by drying the hydrated aggregates; obtaining sintered aggregates by sintering the dry aggregates; and micronizing the sintered aggregates.

2. The process for manufacturing a mixed tantalum powder according to claim 1, wherein the step of obtaining the agglomerated tantalum particles (Y) is the manufacturing process (b) described above and, in addition, in the step of obtaining hydrated aggregates in the manufacturing process (b), stirring in the granulating apparatus is accomplished simultaneously with the addition of water.

3. The process for manufacturing a mixed tantalum powder according to claim 1, wherein a deoxidation treatment step is included after the step of mixing the agglomerated tantalum particles (X) with the agglomerated tantalum particles (Y).

4. The process for manufacturing a mixed tantalum powder according to claim 1, wherein either one or both of the steps of deoxidizing agglomerated tantalum particles (X) and deoxidizing agglomerated tantalum particles (Y) are included prior to the step of mixing the agglomerated tantalum particles (X) with the agglomerated tantalum particles (Y).

5. A process for manufacturing tantalum pellets involving molding a mixed tantalum powder manufactured in accordance with the process for manufacturing a mixed tantalum powder according to claim 1.

6. A mixed tantalum powder containing a mixture of the following agglomerated tantalum particles (X) and agglomerated tantalum particles (Y),
agglomerated tantalum particles (X):
agglomerated tantalum particles, wherein the cumulative fraction of particles with a particle size of 3 μm or less after a 10-minute irradiation with 25-Watt ultrasound is 5 wt % or less,
agglomerated tantalum particles (Y):
agglomerated tantalum particles, wherein the cumulative fraction of particles with a particle size of 3 μm or less after a 10-minute irradiation with 25-Watt ultrasound is 10 wt % or more.

7. A tantalum pellet obtained by molding the mixed tantalum powder according to claim 6.

* * * * *